(12) United States Patent
Wang et al.

(10) Patent No.: US 11,068,741 B2
(45) Date of Patent: Jul. 20, 2021

(54) MULTI-RESOLUTION FEATURE DESCRIPTION FOR OBJECT RECOGNITION

(71) Applicant: QUALCOMM Incorporated, San Diego, CA (US)

(72) Inventors: Lei Wang, Clovis, CA (US); Ning Bi, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 16/224,644

(22) Filed: Dec. 18, 2018

(65) Prior Publication Data

US 2019/0205694 A1 Jul. 4, 2019

Related U.S. Application Data

(60) Provisional application No. 62/611,481, filed on Dec. 28, 2017.

(51) Int. Cl.
| | |
|---|---|
| *G06K 9/00* | (2006.01) |
| *G06K 9/62* | (2006.01) |
| *G06K 9/52* | (2006.01) |
| *G06T 7/50* | (2017.01) |

(Continued)

(52) U.S. Cl.
CPC ....... *G06K 9/6202* (2013.01); *G06K 9/00248* (2013.01); *G06K 9/00268* (2013.01); *G06K 9/00281* (2013.01); *G06K 9/00288* (2013.01); *G06K 9/00926* (2013.01); *G06K 9/42* (2013.01); *G06K 9/46* (2013.01); *G06K 9/527* (2013.01);

(Continued)

(58) Field of Classification Search
None
See application file for complete search history.

(56) References Cited

U.S. PATENT DOCUMENTS 7,187,786 B2 * 3/2007 Kee .................... G06K 9/00221
382/118
7,369,686 B2 * 5/2008 Yokono .............. G06K 9/00221
382/118

(Continued)

FOREIGN PATENT DOCUMENTS

EP 2747028 A1 6/2014

OTHER PUBLICATIONS

Shekhar S., et al., "Synthesis-based Robust Low Resolution Face Recognition", IEEE Transactions on Information Forensics and Security, vol. X, No. X, Month 2017, 10 pages.

(Continued)

*Primary Examiner* — Feng Niu
(74) *Attorney, Agent, or Firm* — Qualcomm Incorporated

(57) ABSTRACT

Techniques and systems are provided for determining features for one or more objects in one or more video frames. For example, an image of an object, such as a face, can be received, and features of the object in the image can be identified. A size of the object can be determined based on the image, for example based on inter-eye distance of a face. Based on the size, either a high-resolution set of features or a low-resolution set of features is selected to compare to the features of the object. The object can be identified by matching the features of the object to matching features from the selected set of features.

30 Claims, 12 Drawing Sheets

(51) Int. Cl.
*G06K 9/42* (2006.01)
*G06K 9/46* (2006.01)

(52) U.S. Cl.
CPC ...... *G06T 7/50* (2017.01); *G06T 2207/10016* (2013.01)

(56) References Cited

U.S. PATENT DOCUMENTS

| | | | | |
|---|---|---|---|---|
| 7,409,091 | B2* | 8/2008 | Sung | G06K 9/00248 382/159 |
| 7,486,826 | B2* | 2/2009 | Sung | G06K 9/00248 382/103 |
| 7,856,151 | B2* | 12/2010 | Lei | G06T 5/002 375/240 |
| 8,467,575 | B2* | 6/2013 | Nishino | G06T 7/246 382/103 |
| 8,559,684 | B1 | 10/2013 | Nechyba | G06K 9/00926 382/118 |
| 8,638,292 | B2* | 1/2014 | Kawakami | G06F 3/0485 345/156 |
| 8,897,575 | B2* | 11/2014 | Ding | G06K 9/4642 382/190 |
| 8,923,585 | B1* | 12/2014 | Peleg | G06T 7/0012 382/128 |
| 9,098,760 | B2 | 8/2015 | Saito et al. | |
| 9,129,189 | B2* | 9/2015 | Hamsici | G06K 9/6277 |
| 9,165,184 | B2 | 10/2015 | Sanderson et al. | |
| 9,224,205 | B2* | 12/2015 | Tsin | G06T 7/251 |
| 9,262,671 | B2* | 2/2016 | Unzueta | G06K 9/00281 |
| 9,349,178 | B1* | 5/2016 | Itu | A61B 5/7267 |
| 9,858,498 | B2 | 1/2018 | Chan et al. | |
| 10,152,648 | B2* | 12/2018 | Filimonova | G06K 9/6262 |
| 10,706,320 | B2* | 7/2020 | Filimonova | G06K 9/6262 |
| 2003/0198368 | A1* | 10/2003 | Kee | G06K 9/00221 382/118 |
| 2005/0094849 | A1* | 5/2005 | Sung | G06K 9/00248 382/103 |
| 2007/0172099 | A1 | 7/2007 | Park et al. | |
| 2007/0189630 | A1* | 8/2007 | Lei | G06T 5/002 382/254 |
| 2010/0079371 | A1* | 4/2010 | Kawakami | G06F 3/0485 345/156 |
| 2011/0228979 | A1* | 9/2011 | Nishino | G06T 7/246 382/103 |
| 2011/0234581 | A1* | 9/2011 | Eikelis | G06K 9/00228 345/419 |
| 2012/0219210 | A1* | 8/2012 | Ding | G06K 9/4642 382/159 |
| 2012/0271156 | A1* | 10/2012 | Bi | A61B 5/055 600/415 |
| 2012/0321142 | A1* | 12/2012 | Trojanova | G06K 9/00281 382/117 |
| 2013/0148860 | A1* | 6/2013 | Musatenko | G06K 9/6206 382/107 |
| 2013/0243272 | A1* | 9/2013 | Hanzawa | G06K 9/00288 382/118 |
| 2013/0335575 | A1* | 12/2013 | Tsin | G06T 7/251 348/169 |
| 2014/0201126 | A1* | 7/2014 | Zadeh | A61B 5/165 706/52 |
| 2014/0270374 | A1* | 9/2014 | Unzueta | G06K 9/00248 382/103 |
| 2015/0049942 | A1* | 2/2015 | Hamsici | G06K 9/6219 382/170 |
| 2015/0154229 | A1* | 6/2015 | An | G06F 16/583 707/728 |
| 2016/0307067 | A1* | 10/2016 | Filimonova | G06K 9/00442 |
| 2017/0061308 | A1* | 3/2017 | Chen | G06N 20/00 |
| 2017/0098119 | A1* | 4/2017 | Gope | G06K 9/40 |
| 2017/0236002 | A1* | 8/2017 | Oh | G06K 9/6215 382/118 |
| 2018/0365519 | A1* | 12/2018 | Pollard | G06K 9/6228 |
| 2019/0071055 | A1* | 3/2019 | Luchner | H04L 63/102 |

OTHER PUBLICATIONS

International Search Report and Written Opinion—PCT/US2018/066611—ISA/EPO—dated Apr. 9, 2019.

* cited by examiner

MULTI-RESOLUTION FEATURE DESCRIPTION FOR OBJECT RECOGNITION

CROSS-REFERENCE TO RELATED APPLICATIONS

This application claims the benefit of U.S. Provisional Application No. 62/611,481, filed Dec. 28, 2017, which is hereby incorporated by reference, in its entirety and for all purposes.

FIELD

The present disclosure generally relates to object detection and recognition, and more specifically to techniques and systems for generating and using multi-resolution feature descriptions for object recognition.

BACKGROUND

Object detection can be used to locate objects in a digital image or a video frame of a video clip. Object recognition can be used to identify and/or verify an identity of an object from a digital image or a video frame. One example of object detection and recognition is face detection and recognition, where a face of a person is detected and recognized. For instance, the features of a face can be extracted from an image and compared with reference features stored in a database in an attempt to recognize the face. In some cases, the extracted features are fed to a classifier and the classifier will give the identity of the input features. Object detection and object recognition are traditionally very time and resource intensive processes. Traditional object detection and recognition can misidentify or fail to recognize objects, particularly when an object in an image and its extracted features look different than a reference image or reference features of the same object, such as when the images or features have very different sizes, resolutions, and/or levels of clarity. This technical problem is particularly noticeable in facial recognition in video surveillance systems.

BRIEF SUMMARY

In some examples, techniques and systems are described for generating and using multi-resolution feature descriptions for objects. The multi-resolution feature descriptions can be used for performing object recognition. Objects can include faces, people, vehicles, and/or any other object of interest. Performing object recognition using one type of feature descriptions can be difficult in some cases. For example, attempting to perform object recognition for detected objects that are small and/or blurry in captured images can lead to rejection of the object recognition results, particularly when enrolled objects being compared to the detected objects are not small and/or are not blurry.

Using faces as an illustrative example of objects, face recognition can be challenging for video surveillance systems or other camera-related systems due, at least in part, to the size and quality of the input faces changing dramatically. For instance, faces detected from video cameras of a video surveillance system (or other camera-based system) can be small and blurry, such as when a person is a far distance from a camera. Enrolled faces are stored in an enrolled database and can be used for comparison against a detected face in order to recognize the detected face. The enrolled faces are typically clear and relatively large. Matching a set of clear and large faces to a small and blurry image of a face is difficult, leading to low recognition confidence scores. Such low confidence scores can lead to the recognition results being rejected by a face detection and recognition system.

The techniques and systems described herein generate multi-resolution feature descriptions for objects. In one illustrative example, two resolutions of object features can be generated, and can be used to recognize different sizes of objects. The multi-resolution feature descriptions can be generated for objects that are detected in images and that are to be enrolled in an enrolled database. For instance, given an image of an object (e.g., a bounding box of a face or other object) detected in an image, the object image can be normalized. A first set of features of the object can be extracted from the normalized object image. The object features from the first set of features are considered to have high feature resolutions, and the first set is referred to herein as a set of high resolution features. The normalized object image can then be modified by changing properties of the image. For example, pixel values of the object image can be modified by applying a low pass filter to the image. A second set of features can then be extracted from the modified object image. The object features from the second set of features are considered to have low feature resolutions that are lower than the first set of features. The second set of features is referred to herein as a set of low resolution features. The high resolution and low resolution features can be stored as enrolled features in an enrolled database. The high resolution features need not all have a same single high resolution—instead, they may all fall within a same range of high resolutions. Similarly, the low resolution features need not all have a same single low resolution—instead, they may all fall within a same range of low resolutions, with the range of low resolutions including at least one resolution that is lower than any included in the range of high resolutions, and with the range of high resolutions including at least one resolution that is higher than any included in the range of low resolutions. For example, the high resolution features may include resolutions exceeding a threshold resolution, while the low resolution features include resolutions falling below the threshold resolution. In some cases, the high resolution and low resolution features can be combined for storage in the enrolled database.

Multi-resolution feature descriptions can also be generated for objects detected in one or more captured input images, which can be compared to the enrolled multi-resolution features for object recognition. For example, an object detection and recognition system can receive an input image, and can detect landmarks of objects in the input image. An inter-landmark distance between two or more landmark features of an object can be determined, and can be used to determine whether to analyze the object using high resolution features or low resolution features. For instance, if the inter-landmark distance for the object is greater than a size threshold, high resolution features can be determined for the object, and sets of high resolution features from the enrolled features can be used for performing object recognition for the object. If the inter-landmark distance for the object is not greater than the size threshold, low resolution features can be determined for the object, and sets of low resolution features from the enrolled features can be used for performing object recognition for the object. Using such multi-resolution feature descriptions, low resolution input images can be matched with low resolution enrolled features, and high resolution input images can be matched with high resolution enrolled features. The multi-resolution feature descriptions allow the matching accuracy to be greatly improved for low resolution input images.

In some cases, multi-resolution feature descriptions may include more than two sets of features. For example, an image of an object—whether an enrolled image or a captured input image—can be used to extract a set of high resolution features, generate a set of medium resolution features with lower resolution than the high resolution features, and generate a set of low resolution features with lower resolution than the medium resolution features. More intermediate resolutions of features may also be generated in addition to the medium resolution features (e.g., high medium, low medium).

According to at least one example, a method of object recognition is provided. The method includes receiving an image of an object, and identifying one or more features of the object from the image. The method further includes determining a size of the object based on the image and selecting, from among at least a first set of features and a second set of features, the first set of features based on the size of the object. Each feature within the first set of features is characterized by a feature resolution falling within a first resolution range, and each feature within the second set of features is characterized by a feature resolution falling within a second resolution range that is different from the first resolution range. The method further includes selecting one or more matching features from the first set of features, each feature of the one or more matching features including at least one of the one or more features of the object in the image. The method further includes determining an identity of the object in the image as being a same identity as a reference object associated with the one or more matching features.

In another example, an apparatus for object recognition is provided that includes one or more memory units that store instructions and one or more processors. The one or more processors are configured to receive an image of an object. Execution of instructions by the one or more processors cause the one or more processors to perform operations that include identifying one or more features of the object in the image and determine a size of the object based on the image. The operations further include selecting, from among at least a first set of features and a second set of features, the first set of features based on the size of the object. Each feature within the first set of features is characterized by a feature resolution falling within a first resolution range, and each feature within the second set of features is characterized by a feature resolution falling within a second resolution range that is different from the first resolution range. The operations further include selecting one or more matching features from the first set of features, each feature of the one or more matching features including at least one of the one or more features of the object in the image. The operations further include determining an identity of the object in the image as being a same identity as a reference object associated with the one or more matching features.

In another example, a non-transitory computer-readable medium is provided that has stored thereon instructions that, when executed by one or more processors, cause the one or more processor to: receive an image of an object; identify one or more features of the object in the image; determine a size of the object based on the image; select, from among at least a first set of features and a second set of features, the first set of features based on the size of the object, wherein each feature within the first set of features is characterized by a feature resolution falling within a first resolution range, wherein each feature within the second set of features is characterized by a feature resolution falling within a second resolution range that is different from the first resolution range; select one or more matching features from the first set of features, each feature of the one or more matching features including at least one of the one or more features of the object in the image; and determine an identity of the object in the image as being a same identity as a reference object associated with the one or more matching features.

In another example, an apparatus for object recognition is provided. The apparatus includes means for receive an image of an object. The apparatus further includes means for identifying one or more features of the object in the image, and means for determining a size of the object based on the image. The apparatus further includes means for selecting, from among at least a first set of features and a second set of features, the first set of features based on the size of the object. Each feature within the first set of features is characterized by a feature resolution falling within a first resolution range, and each feature within the second set of features is characterized by a feature resolution falling within a second resolution range that is different from the first resolution range. The apparatus further includes means for selecting one or more matching features from the first set of features, each feature of the one or more matching features including at least one of the one or more features of the object in the image. The apparatus further includes means for determining an identity of the object in the image as being a same identity as a reference object associated with the one or more matching features.

In some aspects, the methods, apparatuses, and computer-readable medium described above for object recognition further comprise determining that the size of the object is less than a size threshold, wherein the first set of features is selected based on the size of the object being less than the size threshold, and wherein the first set of features includes lower feature resolutions than the second set of features. For example, the first set of features can include one or more low resolution features that are associated with lower feature resolutions than features from the second set of features.

In some aspects, the methods, apparatuses, and computer-readable medium described above for object recognition further comprise determining that the size of the object is greater than a size threshold, wherein the first set of features is selected based on the size of the object being greater than the size threshold, and wherein the first set of features includes higher feature resolutions than the second set of features. For example, the first set of features can include one or more high resolution features that are associated with higher resolutions than features from the second set of features.

In some aspects, the first set of features includes lower feature resolutions than the second set of features. For example, the first set of features can include one or more low resolution features and the second set of features can include one or more high resolution features. The one or more low resolution features are associated with a lower resolution than the one or more high resolution features.

In some aspects, the methods, apparatuses, and computer-readable medium described above for object recognition further comprise: identifying one or more features of the second set of features from an image of the reference object; and storing the one or more features identified from the image in an enrolled database. For example, the one or more features of the second set of features identified from the image can include one or more high resolution features.

In some aspects, the methods, apparatuses, and computer-readable medium described above for object recognition further comprises normalizing the image of the reference object by identifying one or more landmark features of the reference object, scaling the image of the reference object, and aligning the one or more landmark features of the reference object with one or more landmark features of an object template.

In some aspects, the methods, apparatuses, and computer-readable medium described above for object recognition further comprise generating one or more features of the first set of features, including: generating a modified image of the reference object, the modified image being generated by modifying pixel values of the image of the reference object; identifying the one or more features of the first set of features from the modified image; and storing the one or more features of the first set of features in the enrolled database. For example, the one or more features of the first set of features can include one or more low resolution features.

In some aspects, generating the modified image of the reference object includes: generating a filtered image using a low pass filter, the low pass filter filtering out one or more high frequency components of the image of the reference object; generating a downsampled image by downsampling the filtered image; and generating an upsampled image by upsampling the downsampled image, wherein the one or more features of the first set of features are identified using the upsampled image.

In some aspects, the first set of features includes higher feature resolutions than the second set of features. For example, the first set of features can include one or more high resolution features and the second set of features can include one or more low resolution features. The one or more high resolution features are associated with a higher resolution than the one or more low resolution features.

In some aspects, the methods, apparatuses, and computer-readable medium described above for object recognition further comprise: identifying one or more features of the first set of features from an image of the reference object; and storing the one or more features identified from the image in an enrolled database. For example, the one or more features of the first set of features identified from the image can include one or more high resolution features.

In some aspects, the methods, apparatuses, and computer-readable medium described above for object recognition further comprise: normalizing the image of the reference object by identifying one or more landmark features of the reference object, scaling the image of the reference object, and aligning the one or more landmark features of the reference object with one or more landmark features of an object template.

In some aspects, the methods, apparatuses, and computer-readable medium described above for object recognition further comprise: generating one or more features of the second set of features, including: generating a modified image of the reference object, the modified image being generated by modifying pixel values of the image of the reference object; identifying the one or more features of the second set of features from the modified image; and storing the one or more features of the second set of features in the enrolled database. For example, the one or more features of the second set of features can include one or more low resolution features.

In some aspects, generating the modified image of the reference object includes: generating a filtered image using a low pass filter, the low pass filter filtering out one or more high frequency components of the image of the reference object; generating a downsampled image by downsampling the filtered image; and generating an upsampled image by upsampling the downsampled image, wherein the one or more features of the second set of features are identified using the upsampled image.

In some aspects, the first set of features is different than the second set of features.

In some aspects, the image is a video frame.

In some aspects, the object detected in the image includes a face, and the size of the face is determined based on an inter-eye distance between two eyes of the face in the image.

According to at least one example of determining features for enrollment, a method of determining features for one or more objects in one or more video frames is provided. The method includes receiving an image of an object detected in a video frame, and determining one or more high resolution features of the object from the image. The method further includes generating a modified image of the object. The modified image is generated by modifying pixel values of the image. The method further includes determining one or more low resolution features of the object from the modified image. The one or more low resolution features are associated with a lower resolution than the one or more high resolution features of the object. The method further includes storing the one or more high resolution features and the one or more low resolution features for the object in an enrolled database.

In another example of determining features for enrollment, an apparatus for determining features for one or more objects in one or more video frames is provided that includes a memory configured to store video data and a processor. The processor is configured to and can receive an image of an object detected in a video frame, and determine one or more high resolution features of the object from the image. The processor is further configured to and can generate a modified image of the object. The modified image is generated by modifying pixel values of the image. The processor is further configured to and can determine one or more low resolution features of the object from the modified image. The one or more low resolution features are associated with a lower resolution than the one or more high resolution features of the object. The processor is further configured to and can store the one or more high resolution features and the one or more low resolution features for the object in an enrolled database.

In another example of determining features for enrollment, a non-transitory computer-readable medium is provided that has stored thereon instructions that, when executed by one or more processors, cause the one or more processor to: receiving an image of an object detected in a video frame; determining one or more high resolution features of the object from the image; generating a modified image of the object, the modified image being generated by modifying pixel values of the image; determining one or more low resolution features of the object from the modified image, the one or more low resolution features being associated with a lower resolution than the one or more high resolution features of the object; and storing the one or more high resolution features and the one or more low resolution features for the object in an enrolled database.

In another example of determining features for enrollment, an apparatus for determining features for one or more objects in one or more video frames is provided. The apparatus includes means for receiving an image of an object detected in a video frame, and means for determining one or more high resolution features of the object from the image. The apparatus further includes means for generating a modified image of the object. The modified image is generated by modifying pixel values of the image. The apparatus further includes means for determining one or more low resolution features of the object from the modified image. The one or more low resolution features are associated with a lower resolution than the one or more high resolution features of the object. The apparatus further includes means for storing the one or more high resolution features and the one or more low resolution features for the object in an enrolled database.

In some aspects, the methods, apparatuses, and computer-readable medium described above for determining features for enrollment further comprise normalizing the image of the object. Normalizing the image includes scaling the image of the object and aligning one or more landmark features determined for the object with one or more landmark features of an object template.

In some aspects, generating the modified image of the object includes: generating a filtered image using a low pass filter, the low pass filter filtering out one or more high frequency components of the image; generating a downsampled image by downsampling the filtered image; and generating an upsampled image by upsampling the downsampled image; wherein the one or more low resolution features of the object are determined using the upsampled image. In some examples, the low pass filter includes a Gaussian filter or other suitable low pass filter. In some examples, upsampling the downsampled image includes performing interpolation using pixel values of the downsampled image.

In some aspects, the methods, apparatuses, and computer-readable medium described above for determining features for enrollment further comprise: receiving an additional image of an unknown object detected in an additional video frame; determining a size of the unknown object detected in the additional video frame; determining, based on the size of the unknown object, whether to determine one or more high resolution features for the unknown object or one or more low resolution features for the unknown object, the one or more low resolution features of the unknown object being associated with a lower resolution than the one or more high resolution features of the unknown object; and determining an identity of the unknown object in the additional video frame as being a same identity as the object detected in the video frame.

In some aspects, the unknown object detected in the additional video frame is a face, and the size of the face is determined based on an inter-eye distance between eyes of the face in the video frame.

In some aspects, the one or more high resolution features are determined for the unknown object when the size of the unknown object is greater than a size threshold, and the one or more low resolution features are determined for the unknown object when the size of the unknown object is not greater than the size threshold.

In some aspects, the methods, apparatuses, and computer-readable medium described above for determining features for enrollment further comprise: determining the size of the unknown object is greater than a size threshold; and determining the one or more high resolution features for the unknown object based on the size of the unknown object being greater than the size threshold.

In some aspects, determining the identity of the unknown object in the additional video frame is the same identity as the object detected in the video frame includes: obtaining high resolution features of a plurality of objects from the enrolled database; comparing the one or more high resolution features of the unknown object to the high resolution features of the plurality of objects from the enrolled database; and determining the one or more high resolution features of the unknown object match the one or more high resolution features of the object.

In some aspects, the methods, apparatuses, and computer-readable medium described above for determining features for enrollment further comprise: determining the size of the unknown object is not greater than a size threshold; and determining the one or more low resolution features for the unknown object based on the size of the unknown object not being greater than the size threshold.

In some aspects, determining the identity of the unknown object in the additional video frame is the same identity as the object detected in the video frame includes: obtaining low resolution features of a plurality of objects from the enrolled database; comparing the one or more low resolution features of the unknown object to the low resolution features of the plurality of objects from the enrolled database; and determining the one or more low resolution features of the unknown object match the one or more low resolution features of the object.

In some aspects, the object includes a face.

In some aspects, the one or more high resolution features and the one or more low resolution features of the object include one or more representative feature vectors.

In some aspects, the apparatus comprises a camera for capturing the one or more video frames. In some aspects, the apparatus comprises a mobile device with a camera for capturing the one or more video frames. In some cases, the apparatus comprises a display for displaying the one or more video frames.

According to an example of determining features for unknown objects, a method of determining features for one or more objects in one or more video frames is provided. The method includes receiving an image of an unknown object detected in a video frame, and determining a size of the unknown object detected in the video frame. The method further includes determining, based on the size of the unknown object, whether to determine one or more high resolution features for the unknown object or one or more low resolution features for the unknown object, the one or more low resolution features of the unknown object being associated with a lower resolution than the one or more high resolution features of the unknown object.

In another example of determining features for unknown objects, an apparatus for determining features for one or more objects in one or more video frames is provided that includes a memory configured to store video data and a processor. The processor is configured to and can receiving an image of an unknown object detected in a video frame, and determine a size of the unknown object detected in the video frame. The processor is further configured to and can determine, based on the size of the unknown object, whether to determine one or more high resolution features for the unknown object or one or more low resolution features for the unknown object, the one or more low resolution features of the unknown object being associated with a lower resolution than the one or more high resolution features of the unknown object.

In another example of determining features for unknown objects, a non-transitory computer-readable medium is provided that has stored thereon instructions that, when executed by one or more processors, cause the one or more processor to: receiving an image of an unknown object detected in a video frame; determining a size of the unknown object detected in the video frame; and determining, based on the size of the unknown object, whether to determine one or more high resolution features for the unknown object or one or more low resolution features for the unknown object, the one or more low resolution features of the unknown object being associated with a lower resolution than the one or more high resolution features of the unknown object.

In another example of determining features for unknown objects, an apparatus for determining features for one or more objects in one or more video frames is provided. The apparatus includes means for receiving an image of an unknown object detected in a video frame, and determining a size of the unknown object detected in the video frame. The apparatus further includes means for determining, based on the size of the unknown object, whether to determine one or more high resolution features for the unknown object or one or more low resolution features for the unknown object, the one or more low resolution features of the unknown object being associated with a lower resolution than the one or more high resolution features of the unknown object.

In some aspects, the methods, apparatuses, and computer-readable medium described above for determining features for unknown objects further comprise: generating a modified image of the unknown object, the modified image being generated by modifying pixel values of the image. In such aspects, the one or more low resolution features of the unknown object are determined from the modified image.

In some aspects, generating the modified image of the object includes: generating a filtered image using a low pass filter, the low pass filter filtering out one or more high frequency components of the image; generating a downsampled image by downsampling the filtered image; and generating an upsampled image by upsampling the downsampled image; wherein the one or more low resolution features of the unknown object are determined using the upsampled image. In some examples, the low pass filter includes a Gaussian filter or other suitable low pass filter. In some examples, upsampling the downsampled image includes performing interpolation using pixel values of the downsampled image.

In some aspects, the methods, apparatuses, and computer-readable medium described above for determining features for unknown objects further comprise normalizing the image of the unknown object. Normalizing the image includes scaling the image of the unknown object and aligning one or more landmark features determined for the unknown object with one or more landmark features of an object template.

In some aspects, the methods, apparatuses, and computer-readable medium described above for determining features for unknown objects further comprise: determining an identity of the unknown object in the additional video frame as being a same identity as an object from an enrolled database.

In some aspects, the unknown object detected in the additional video frame is a face, and the size of the face is determined based on an inter-eye distance between eyes of the face in the video frame.

In some aspects, the one or more high resolution features are determined for the unknown object when the size of the unknown object is greater than a size threshold, and the one or more low resolution features are determined for the unknown object when the size of the unknown object is not greater than the size threshold.

In some aspects, the methods, apparatuses, and computer-readable medium described above for determining features for unknown objects further comprise: determining the size of the unknown object is greater than a size threshold; and determining the one or more high resolution features for the unknown object based on the size of the unknown object being greater than the size threshold.

In some aspects, determining the identity of the unknown object in the additional video frame is the same identity as the object from the enrolled database includes: obtaining high resolution features of a plurality of objects from the enrolled database; comparing the one or more high resolution features of the unknown object to the high resolution features of the plurality of objects from the enrolled database; and determining the one or more high resolution features of the unknown object match the one or more high resolution features of the object.

In some aspects, the methods, apparatuses, and computer-readable medium described above for determining features for unknown objects further comprise: determining the size of the unknown object is not greater than a size threshold; and determining the one or more low resolution features for the unknown object based on the size of the unknown object not being greater than the size threshold.

In some aspects, determining the identity of the unknown object in the additional video frame is the same identity as the object from the enrolled database includes: obtaining low resolution features of a plurality of objects from the enrolled database; comparing the one or more low resolution features of the unknown object to the low resolution features of the plurality of objects from the enrolled database; and determining the one or more low resolution features of the unknown object match the one or more low resolution features of the object.

In some aspects, the unknown object includes a face.

In some aspects, the one or more high resolution features and the one or more low resolution features of the unknown object include one or more representative feature vectors.

In some aspects, the apparatus comprises a camera for capturing one or more images and/or one or more video frames. In some aspects, the apparatus comprises a mobile device with a camera for capturing images and/or video frames. In some cases, the apparatus comprises a display for displaying one or more images and/or one or more video frames.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
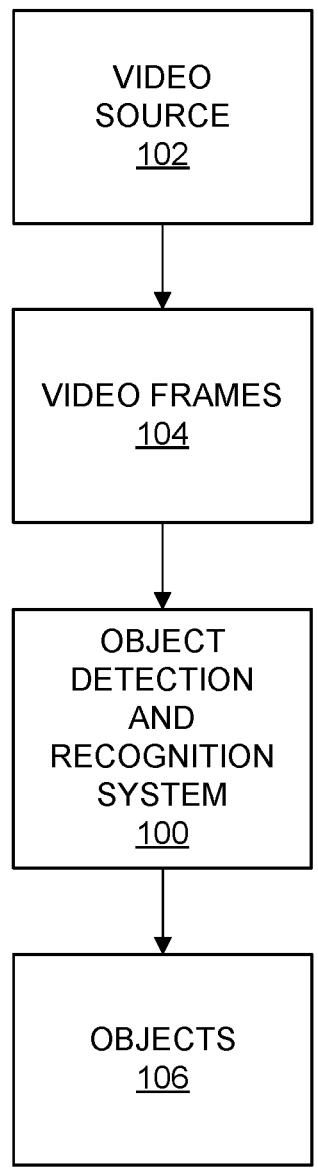
FIG. 1 is a block diagram illustrating an example of system for detecting and recognizing objects in one or more video frames, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As described in more detail herein, techniques and systems are described for generating and using multi-resolution feature descriptions for objects in one or more images. Both high resolution and low resolution feature descriptions (also referred to as "features") can be generated for objects that are to be enrolled in an enrolled database. The resolution of the object features indicates a quality of the object features. In some cases, the feature resolution of an object's features extracted from an image is independent of the resolution of the image itself. For example, the resolution of the features of an object can be based on a distance of the object from the camera, and/or based on other factors.

As described herein, an enrolled database can be used as a reference database for performing object recognition. When one or more input images are received, object recognition can be performed using either the high resolution features or the low resolution features. For example, objects detected in an input image can be analyzed to determine whether to generate high resolution features or low resolution features for the object. In some cases, an inter-landmark distance between two or more landmark features of an object can be used to determine whether to generate the high resolution features or low resolution features for the object. If low resolution features are generated for the object in the input image, the low resolution features for the enrolled objects in the enrolled database are used for comparison with the low resolution features of the object. If high resolution features are generated for the object in the input image, the high resolution features for the enrolled objects in the enrolled database are used for comparison with the high resolution features of the object. Details of an example object detection and recognition system are described below with respect to FIG. 1 and FIG. 2.

The techniques and systems described herein can be used in any suitable device for any suitable application. For example, the object detection and recognition systems 100 and/or 200 described below can be used in an IP Camera, a connected home device (e.g., a network-connected speaker, a network-connected home appliance, or the like), a drone or unmanned aerial vehicle, in robotics, in automotive-based devices, in mobile devices, and/or in any other suitable devices. Applications can include security cameras, security robots, smart assistants, smart sound bars, intelligent personal assistants, drone applications (e.g., "follow me" or "find me" functions), a personal assistant inside the car (e.g. automatic seat adjustment, automatic seat belt adjustment, automatic entertainment control (e.g., movie, music, etc.), or any other suitable application.

Methods and systems are described for receiving an image of an object such as a face and identifying features of the object in the image. A size of the object is determined based on the image. In one illustrative example, the size can be based on an inter-eye distance of a face. Other size-based metrics can also be used. Based on the size, either a high resolution set of features is selected or a low resolution set of features is selected to compare to the features of the object. The object can then be identified by matching the features of the object to matching features from the selected set of features.

FIG. 1 is a block diagram illustrating an example of a system for detecting and recognizing objects in one or more images. The one or more images can include video frames or other images. For example, the object detection and recognition system 100 can receive video frames 104 from a video source 102. The video frames 104 can also be referred to herein as video pictures or pictures. The video frames 104 capture or contain images of a scene, and can be part of one or more video sequences. The video source 102 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 102 can include an Internet Protocol (IP) camera or multiple IP cameras. An IP camera is a type of digital video camera that can be used for surveillance, home security, recreational purposes, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment. In one illustrative example, multiple IP cameras can be located throughout a scene or environment, and can provide the video frames 104 to the object detection and recognition system 100. For instance, the IP cameras can be placed at various fields of view within the scene so that surveillance can be performed based on the captured video frames 104 of the scene. While video frames are used herein as an example of images on which object detection and recognition are performed, one of ordinary skill will appreciate that the object detection and recognition techniques described herein can also be performed on images other than video frames, such as still images captured by a camera, a group of images captured by a camera that are not part of a video, or other suitable images.

In some embodiments, the object detection and recognition system 100 and the video source 102 can be part of the same computing device. In some embodiments, the object detection and recognition system 100 and the video source 102 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The object detection and recognition system 100 processes the video frames 104 to detect and/or track objects in the video frames 104. When object detection and recognition are performed for one or more still images (not video), the objects may be detected, but not tracked. In some cases, the objects can also be recognized by comparing features of the detected and/or tracked objects with enrolled objects that are registered with the object detection and recognition system 100. As described in more detail below, multi-resolution features can be generated and used for object recognition. For example, a low resolution features can be used for smaller detected objects (e.g., objects that are far away from a camera video source 102 during capture, or other small objects), while high resolution features can be used for bigger objects (e.g., those objects that are closer to a camera video source 102 during capture, or other big objects). The object detection and recognition system 100 outputs objects 106 as detected (and possibly tracked) objects and/or as recognized objects.

Any type of object detection and recognition can be performed by the object detection and recognition system 100. An example of object detection and recognition includes face detection and recognition, where faces of people in a scene captured by video frames (or other images) can be analyzed for detection, possible tracking, and recognition using the techniques described herein. An example face recognition process identifies and/or verifies an identity of a person from a digital image or a video frame of a video clip. In some cases, the features of the face are extracted from the image and compared with features of known faces stored in a database (e.g., an enrolled database or other storage). In some cases, the extracted features are fed to a classifier and the classifier can give the identity of the input features or can help categorize the object based on the features found. For example, if two eyes, a nose, and a mouth are found in close proximity to each other, it is likely that these belong to a face, which is a type of object that the classifier can help identify. One illustrative example of a process for recognizing a face includes performing face detection, face tracking, facial landmark detection, face normalization, feature extraction, and face identification and/or face verification. Face detection is a kind of object detection in which the focus includes detecting objects that are faces. While techniques are described herein using face recognition as an illustrative example of object recognition, one of ordinary skill will appreciate that the same techniques can apply to recognition of other types of objects, such as other portions of the human body, vehicles, animals, human beings generally, men specifically, women specifically, children, queues, food, beverages, products, articles of clothing, computing devices, currencies, street signs, street lights, typed or handwritten text, and/or other types of objects.

Figure 2:
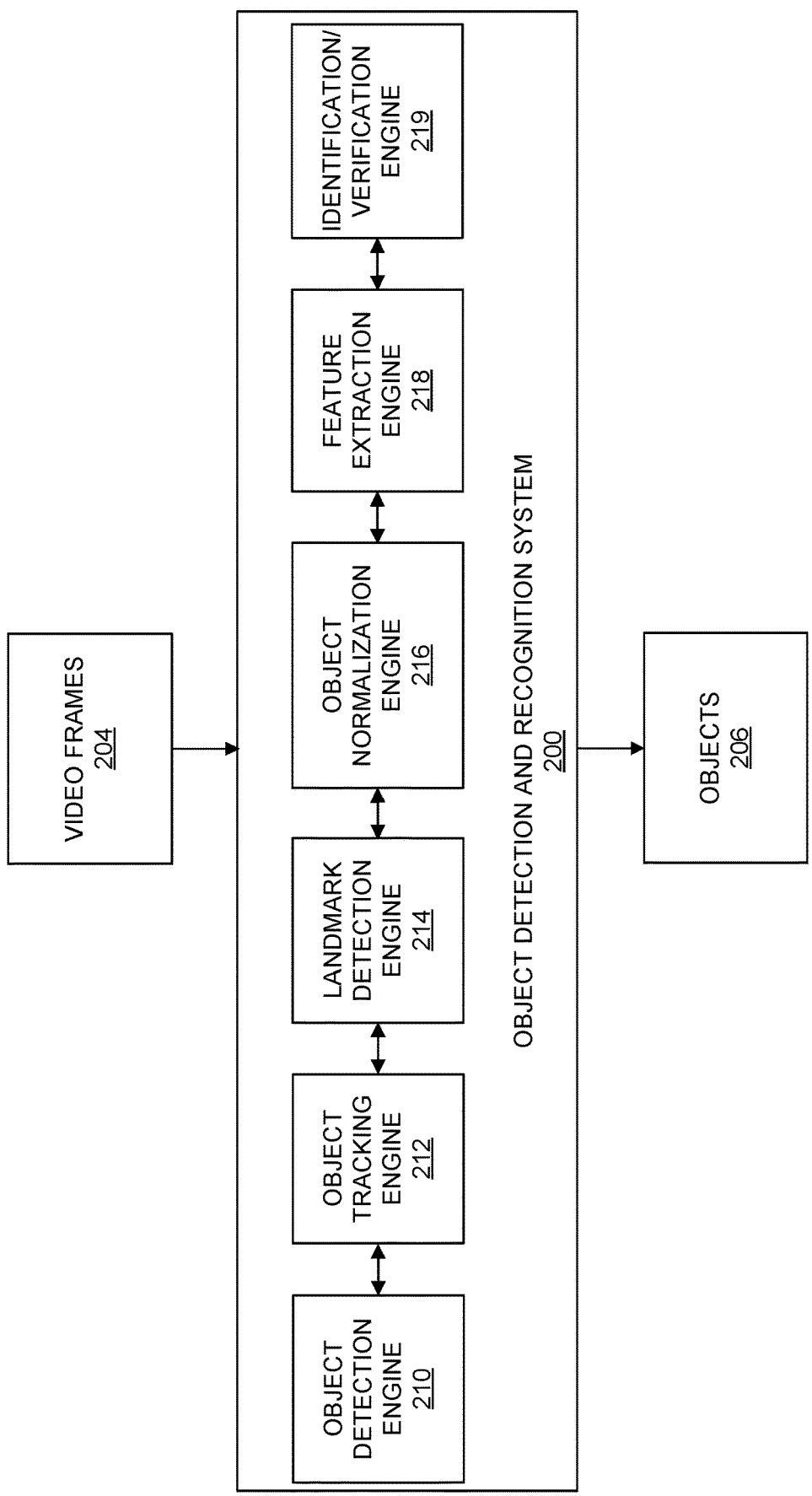
FIG. 2 is an example of an object detection and recognition system that can perform object detection and object recognition, in accordance with some examples.

FIG. 2 is a block diagram illustrating an example of an object detection and recognition system 200. The object detection and recognition system 200 processes video frames 204 and outputs objects 206 as detected, tracked, and/or recognized objects. The object detection and recognition system 200 can perform any type of object recognition. An example of object recognition performed by the object detection and recognition system 200 includes face recognition. However, one of ordinary skill will appreciate that any other suitable type of object recognition can be performed by the object detection and recognition system 200. One example of a full face recognition process for recognizing objects in the video frames 204 includes the following steps: object detection; object tracking; object landmark detection; object normalization; feature extraction; and identification and/or verification. Object recognition can be performed using some or all of these steps, with some steps being optional in some cases.

The object detection and recognition system 200 includes an object detection engine 210 that can perform object detection. Object detection is a technology to detect or locate objects from an image or video frame. Detected objects can be represented using bounding regions that identify the location and/or approximate boundaries of the object (e.g., the face) in the image or video frame. A bounding region of a detected object can include a bounding box, a bounding circle, a bounding ellipse, or any other suitably-shaped region representing a detected object. While examples are described herein using bounding boxes for illustrative purposes, the techniques and systems described herein can also apply using other suitably shaped bounding regions. In one illustrative example, the object detection engine 210 can perform face detection to detect one or more faces in an image or video frame. The object detection engine 210 can provide a bounding box for each detected face. Many object detection algorithms (including face detection algorithms) use template matching techniques to locate objects (e.g., faces) from the images. Various types of template matching algorithms can be used. In other object detection algorithm can also be used by the object detection engine 210.

One example of a template matching algorithm contains four steps, including Haar or Haar-like feature extraction, integral image generation, Adaboost training, and cascaded classifiers. Such an object detection technique performs detection by applying a sliding window across a frame or image, the window being rectangular, circular, triangular, or another shape. An Integral image may be computed to be an image representation evaluating particular regional features, for example rectangular or circular features, from an image. For each current window, the Haar features of the current window are computed from an Integral image, which is computed beforehand. The Harr features may be computed by calculating sums of image pixels within particular feature regions of the object image, such as those of the Integral image. In faces, for example, a region with an eye is typically darker than a region with a nose bridge or cheeks. An example of Haar features is illustrated in image 1130 of FIG. 11C. The Haar features are selected by an Adaboost learning algorithm that selects the best features and/or trains classifiers that use them, and can be used to classify a window as a face (or other object) window or a non-face window effectively with a cascaded classifier. The cascaded classifier includes many classifiers combined in a cascade, which allows background regions of the image to be quickly discarded while spending more computation on object-like regions. For example, the cascaded classifier can classify a current window into a face category or a non-face category. If one classifier classifies a window as a non-face category, the window is discarded. Otherwise, if one classifier classifies a window as a face category, a next classifier in the cascaded arrangement will be used to test again. Until all the classifiers determine the current window is a face (or other object), the window will be labeled as a candidate for being a face (or other object). After all the windows are detected, a non-max suppression algorithm is used to group the face windows around each face to generate the final result of detected faces. Further details of such an object detection algorithm is described in P. Viola and M. Jones, "Robust real time object detection," IEEE ICCV Workshop on Statistical and Computational Theories of Vision, 2001, which is hereby incorporated by reference, in its entirety and for all purposes.

Other suitable object detection techniques could also be performed by the object detection engine 210. One other illustrative example of an object detection technique includes example-based learning for view-based face detection, such as that described in K. Sung and T. Poggio, "Example-based learning for view-based face detection," IEEE Patt. Anal. Mach. Intell., volume 20, pages 39-51, 1998, which is hereby incorporated by reference, in its entirety and for all purposes. Another example is neural network-based object detection, such as that described in H. Rowley, S. Baluja, and T. Kanade, "Neural network-based face detection," IEEE Patt. Anal. Mach. Intell., volume 20, pages 22-38, 1998, which is hereby incorporated by reference, in its entirety and for all purposes. Yet another example is statistical-based object detection, such as that described in H. Schneiderman and T. Kanade, "A statistical method for 3D object detection applied to faces and cars," International Conference on Computer Vision, 2000, which is hereby incorporated by reference, in its entirety and for all purposes. Another example is a snowbased object detector, such as that described in D. Roth, M. Yang, and N. Ahuja, "A snowbased face detector," Neural Information Processing 12, 2000, which is hereby incorporated by reference, in its entirety and for all purposes. Another example is a joint induction object detection technique, such as that described in Y. Amit, D. Geman, and K. Wilder, "Joint induction of shape features and tree classifiers," 1997, which is hereby incorporated by reference, in its entirety and for all purposes. Any other suitable image-based object detection techniques can be used.

The object detection and recognition system 200 further includes an object tracking engine 212 that can perform object tracking for one or more of the objects detected by the object detection engine 210. In some cases, the object detection and recognition system 200 does not include an object tracking engine 212. For example, for non-video applications, the object detection and recognition system 200 may not use or may not include an object tracking engine 212. Object tracking includes tracking objects across multiple frames of a video sequence or a sequence of images. In one illustrative example, the object tracking engine 212 can track faces detected by the object detection engine 210. For instance, face tracking can be performed to track faces across frames or images. The full object recognition process (e.g., a full face recognition process) is time consuming and resource intensive, and thus while it is an option to scan every video frame with the same object recognition algorithms discussed above, it is sometimes not realistic in terms of time and computing resources to recognize all objects (e.g., faces) for every frame, such as when numerous faces are captured in a current frame. As used herein, a current frame refers to a frame currently being processed. In order to reduce the time and resources needed for object recognition, object tracking techniques can be used to track previously recognized faces. For example, if a face has been recognized and the object detection and recognition system 200 is confident of the recognition results (e.g., a high confidence score is determined for the recognized face), the object detection and recognition system 200 can skip the full recognition process for the face in one or several subsequent frames if the face can be tracked successfully by the object tracking engine 212.

Any suitable object tracking technique can be used by the object tracking engine 212. Examples of trackers that can be used include optical flow based trackers, template matching based trackers, meanshift trackers, continuously adaptive meanshift (camshift) trackers, Kernelized Correlation Filters (KCF) trackers, Kalman filter based trackers, or other suitable tracker can be used. For example, in some cases, dense optical flow based trackers can estimate the motion vector of pixels (in some cases, all pixels) in a video frame in order to track the movement of the pixels across video frames. For instance, image motion can be recovered at each pixel from spatio-temporal image brightness variations. In some cases, sparse optical flow based trackers (e.g., the Kanade-Lucas-Tomashi (KLT) tracker) can track the location of one or more specific feature points (e.g., one or more corners, textured areas, edges, or other distinct or visual features) in an image.

Template matching based trackers obtain a template of an image feature that is to be tracked across images, and use the template to search for the image feature in the images. For example, as the template slides across an input image, the template is compared or matched to the portion of the image directly under it. The matching is performed by calculating a number that indicates the extent to which the template and the portion of the original image at which the template is currently located are equal (or correlated). The location in the original image that has the greatest correlation (minimum difference from the template) is where the image feature represented by the template is located in the original image. The matching number can depend on the calculation that is used by the template matching algorithm. In one illustrative example, a complete match can be denoted by a 0 (indicating zero difference between the template and the portion of the original image) or a 1 (indicating a complete match).

Meanshift and camshift trackers locate the maxima of a density function to perform tracking. For instance, given a set of points, such as a pixel distribution (e.g., using a histogram backprojected image, which records how well the pixels of a given image fit the distribution of pixels in a histogram model, or other suitable distribution) and a window region, the meanshift tracker can move the window region to the area of maximum pixel density (e.g., to the area with a maximum number of points in the distribution). When an object moves from one image to another, the movement is reflected in pixel distribution (e.g., the histogram back-projected image). The meanshift tracker can then move the window region to the new location with maximum density. A camshift tracker is a modified meanshift tracker that can adapt the window size using a size and rotation of the target object. The camshift tracker can first apply the meanshift operation, and once the meanshift converges, the camshift tracker updates the size of the window (e.g., with the updated size $$s = 2 \times \sqrt{\frac{M_{00}}{256}}).$$

The camshift tracker can also calculate the orientation of a best fitting shape (e.g., ellipse, circle, square, or the like) to the target. The tracker can apply the meanshift technique with a new scaled search window and previous window location. The process is continued until the required accuracy is achieved.

A KCF filter is a correlation filter based trackers, and attempts to identify the best filter taps that maximize the response when correlated with a target template that looks similar in appearance to training data. KCF tracks objects by solving a simple rigid regression problem over training data in the dual form, which allows the use of both multi-dimensional features and non-linear kernels (e.g., Gaussian).

A Kalman filter based object tracker uses signal processing to predict the location of a moving object based on prior motion information. For example, the location of a tracker in a current frame can be predicted based on information from a previous frame. In some cases, the Kalman filter can measure a tracker's trajectory as well as predict its future location(s). For example, the Kalman filter framework can include two steps. The first step is to predict a tracker's state, and the second step is to use measurements to correct or update the state. In this case, the tracker from the last frame can predict its location in the current frame. When the current frame is received, the tracker can use the measurement of the object in the current frame to correct its location in the current frame, and then can predict its location in the next frame. The Kalman filter can rely on the measurement of the associated object(s) to correct the motion model for the object tracker and to predict the location of the tracker in the next frame.

Another illustrative example of an object tracking technique includes a key point technique. Using face tracking as an example, the key point technique can include detecting some key points from a detected face (or other object) in a previous frame. For example, the detected key points can include significant points on face, such as facial landmarks (described in more detail below). The key points can be matched with features of objects in a current frame using template matching. Examples of template matching methods can include optical flow (as described above), local feature matching, and/or other suitable techniques. In some cases, the local features can be histogram of gradient, local binary pattern (LBP), or other features. Based on the tracking results of the key points between the previous frame and the current frame, the faces in the current frame that match faces from a previous frame can be located.

Figure 3:
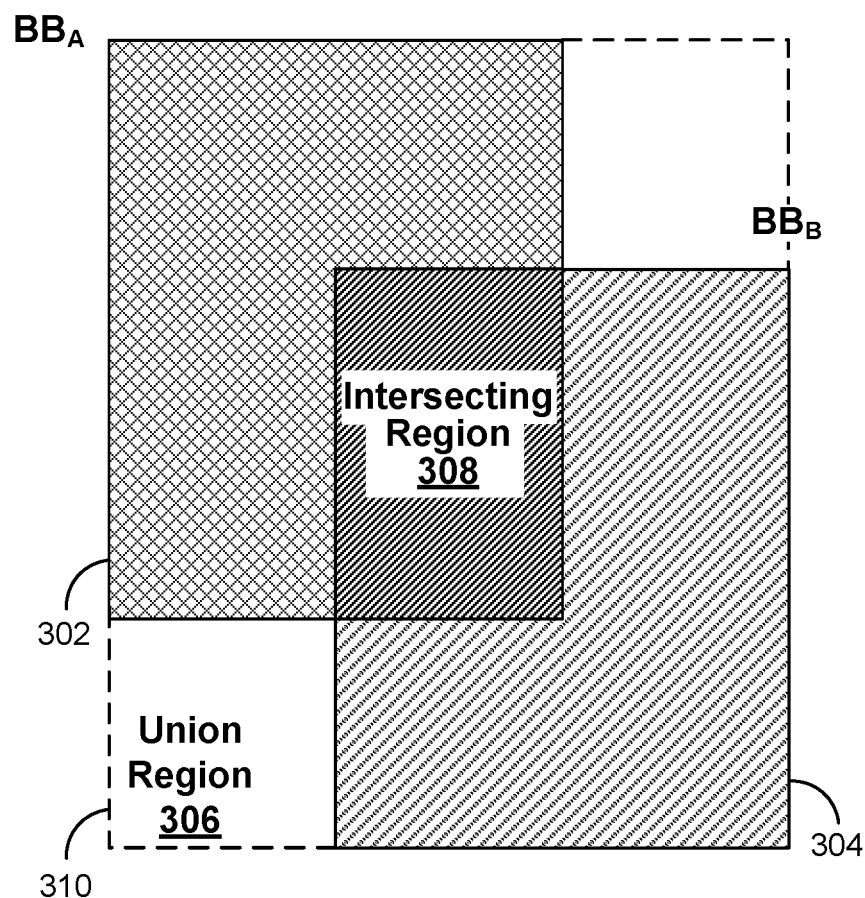
FIG. 3 is a diagram illustrating an example of an intersection and union of two bounding boxes, in accordance with some examples.

Another example object tracking technique is based on the face detection results. For example, the intersection over union (IOU) of face bounding boxes can be used to determine if a face detected in the current frame matches a face detected in the previous frame. FIG. 3 is a diagram showing an example of an intersection I and union U of two bounding boxes, including bounding box $BB_A$ 302 of an object in a current frame and bounding box $BB_B$ 304 of an object in the previous frame. The intersecting region 308 includes the overlapped region between the bounding box $BB_A$ 302 and the bounding box $BB_B$ 304.

The union region 306 includes the union of bounding box $BB_A$ 302 and bounding box $BB_B$ 304. The union of bounding box $BB_A$ 302 and bounding box $BB_B$ 304 is defined to use the far corners of the two bounding boxes to create a new bounding box 310 (shown as dotted line).

More specifically, by representing each bounding box with (x, y, w, h), where (x,y) is the upper-left coordinate of a bounding box, w and h are the width and height of the bounding box, respectively, the union of the bounding boxes would be represented as follows:

$$\text{Union}(BB_1, BB_2) = (\min(x_1, \min(y_1, y_2), (\max(x_1+w_1-1, x_2+w_2-1) - \min(x_1, x_2)), (\max(y_1+h_1-1, y_2+h_2-1) - \min(y_1, y_2)))$$

Using FIG. 3 as an example, the first bounding box $BB_A$ 302 and the second bounding box $BB_B$ 304 can be determined to match for tracking purposes if an overlapping area between the first bounding box $BB_A$ 302 and the second bounding box $BB_B$ 304 (the intersecting region 308) divided by the union 310 of the bounding boxes $BB_A$ 302 and $BB_B$ 304 is greater than an IOU threshold $$\left(\text{denoted as } T_{IOU} < \frac{\text{Area of Intersecting Region 308}}{\text{Area of Union 310}}\right).$$

The IOU threshold can be set to any suitable amount, such as 50%, 60%, 70%, 75%, 80%, 90%, or other configurable amount. In one illustrative example, the first bounding box $BB_A$ 302 and the second bounding box $BB_B$ 304 can be determined to be a match when the IOU for the bounding boxes is at least 70%. The object in the current frame can be determined to be the same object from the previous frame based on the bounding boxes of the two objects being determined as a match.

In another example, an overlapping area technique can be used to determine a match between bounding boxes. For instance, the first bounding box $BB_A$ 302 and the second bounding box $BB_B$ 304 can be determined to be a match if an area of the first bounding box $BB_A$ 302 and/or an area the second bounding box $BB_B$ 304 that is within the intersecting region 308 is greater than an overlapping threshold. The overlapping threshold can be set to any suitable amount, such as 50%, 60%, 70%, or other configurable amount. In one illustrative example, the first bounding box $BB_A$ 302 and the second bounding box $BB_B$ 304 can be determined to be a match when at least 65% of the first bounding box $BB_A$ 302 or the second bounding box $BB_B$ 304 is within the intersecting region 308.

In some implementations, any of the above-described and/or other tracking techniques can be combined to achieve even more robust tracking results. Any other suitable object tracking (e.g., face tracking) techniques can also be used. Using any suitable technique, face tracking can reduce the face recognition time significantly, which in turn can save CPU bandwidth and power.

Figure 4A:
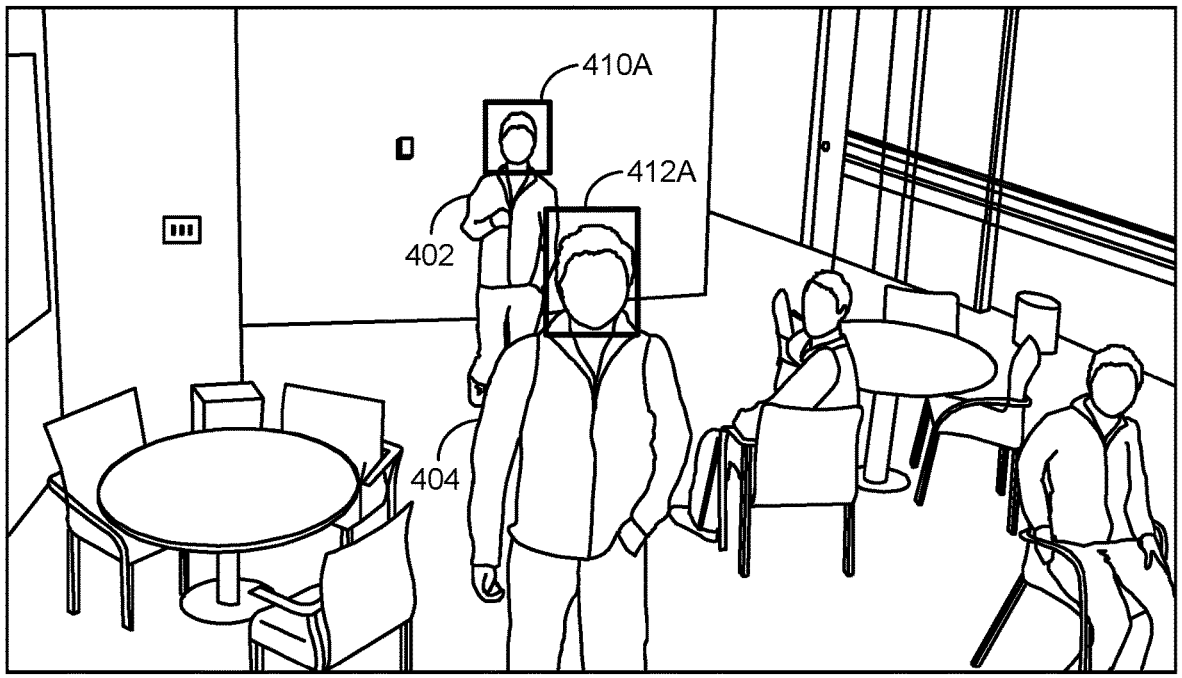
FIG. 4A is an example of a video frame showing detected objects within a scene being tracked, in accordance with some examples.
Figure 4B:
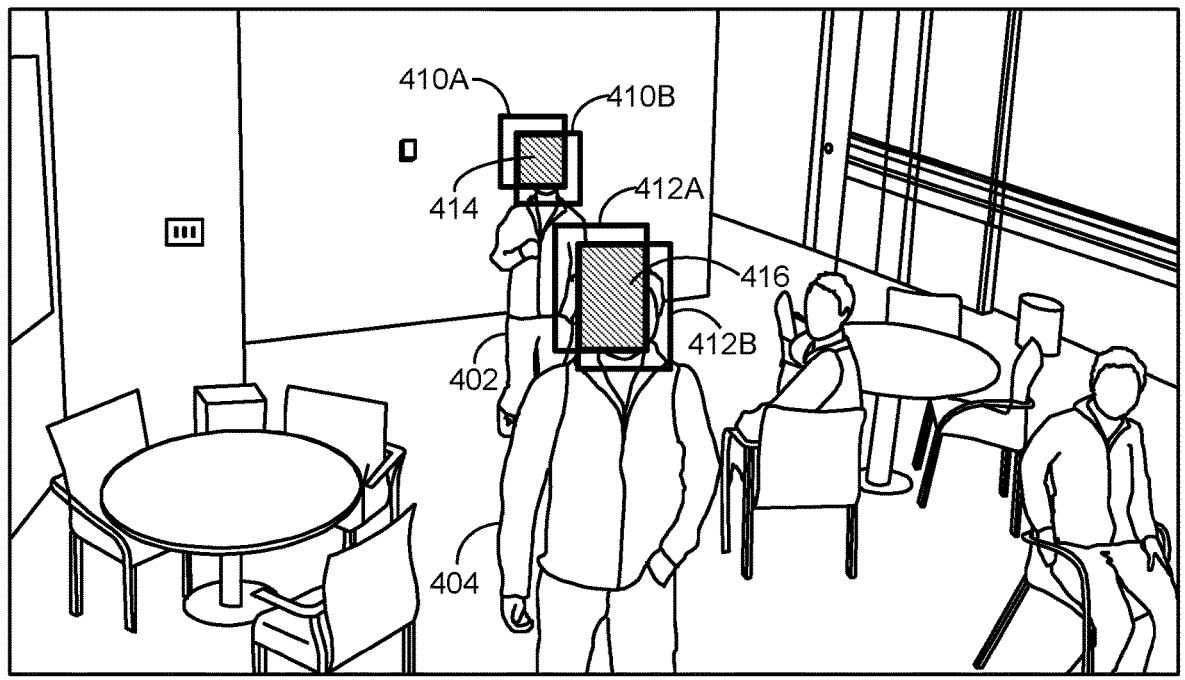
FIG. 4B is an example of a video frame showing detected objects within a scene being tracked, in accordance with some examples.

An illustrative example of face tracking is illustrated in FIG. 4A and FIG. 4B. As noted above, a face can be tracked over a sequence of video frames based on face detection. For instance, the object tracking engine 212 can compare a bounding box of a face detected in a current frame against all the faces detected in the previous frame to determine similarities between the detected face and the previously detected faces. The previously detected face that is determined to be the best match is then selected as the face that will be tracked based on the currently detected face. In some cases, the face detected in the current frame can be assigned the same unique identifier as that assigned to the previously detected face in the previous frame.

The video frames 400A and 400B shown in FIG. 4A and FIG. 4B illustrate two frames of a video sequence capturing images of a scene. The multiple faces in the scene captured by the video sequence can be detected and tracked across the frames of the video sequence, including frames 400A and 400B. The frame 400A can be referred to as a previous frame and the frame 400B can be referred to as a current frame.

As shown in FIG. 4A, the face of the person 402 is detected from the frame 400A and the location of the face is represented by the bounding box 410A. The face of the person 404 is detected from the frame 400A and the location of the face is represented by the bounding box 412A. As shown in FIG. 4B, the face of the person 402 is detected from the frame 400B and the location of the face is represented by the bounding box 410B. Similarly, the face of the person 404 is detected from the frame 400B and its location is represented by the bounding box 412B. The object detection techniques described above can be used to detect the faces.

The persons 402 and 404 are tracked across the video frames 400A and 400B by assigning a unique tracking identifier to each of the bounding boxes. A bounding box in the current frame 400B that matches a previous bounding box from the previous frame 400A can be assigned the unique tracking identifier that was assigned to the previous bounding box. In this way, the face represented by the bounding boxes can be tracked across the frames of the video sequence. For example, as shown in FIG. 4B, the current bounding box 410B in the current frame 400B is matched to the previous bounding box 410A from the previous frame 400A based on a spatial relationship between the two bounding boxes 410A and 410B or based on features of the faces. In one illustrative example, as described above, an intersection over union (IOU) approach can be used, in which case the current bounding box 410B and the previous bounding box 410A can be determined to match if the intersecting region 414 (also called an overlapping area) divided by a union of the bounding boxes 410A and 410B is greater than an IOU threshold. The IOU threshold can be set to any suitable amount, such as 70% or other configurable amount. In another example, an overlapping area technique can be used, in which case the current bounding box 410B and the previous bounding box 410A can be determined to be a match if at least a threshold amount of the area of the bounding box 410B and/or the area the bounding box 410A is within the intersecting region 414. The overlapping threshold can be set to any suitable amount, such as 70% or other configurable amount. In some cases, the key point technique described above could also be used, in which case key points are matched with features of the faces in the current frame using template matching. Similar techniques can be used to match the current bounding box 412B with the previous bounding box 412A (e.g., based on the intersecting region 416, based on key points, or the like).

Returning to FIG. 2, the landmark detection engine 214 can perform object landmark detection. For example, the landmark detection engine 214 can perform facial landmark detection for face recognition. Facial landmark detection can be an important step in face recognition. For instance, object landmark detection can provide information for object tracking (as described above with respect to at least the object tracking engine 212, FIG. 3, FIG. 4A, and FIG. 4B) and can also provide information for face normalization (as described below with respect to at least the object normalization engine 216). A good landmark detection algorithm can improve the object recognition accuracy significantly, such as face or person recognition.

Figure 11A:
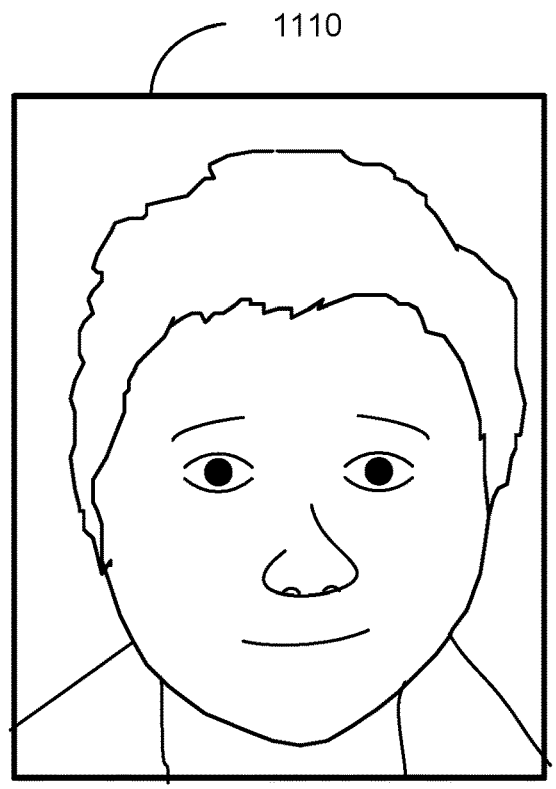
FIG. 11A illustrates an image of a face.
Figure 11B:
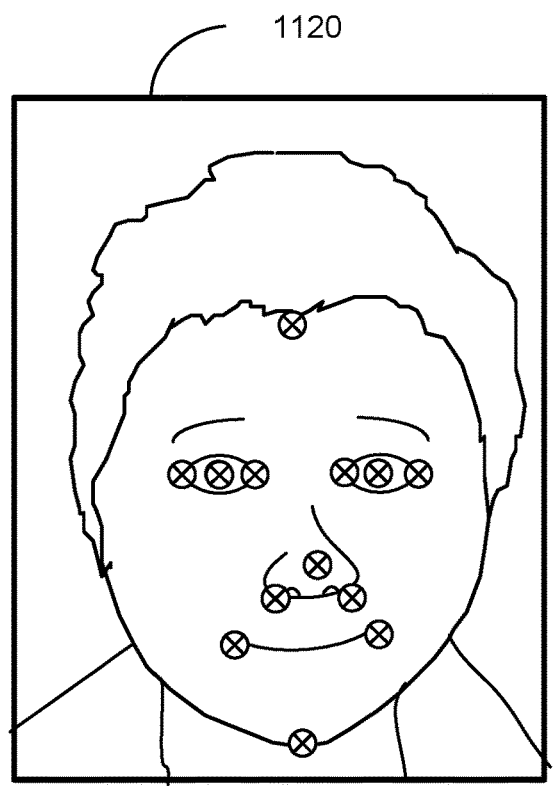
FIG. 11B illustrates identification of features within the face in the image of FIG. 11A.
Figure 11C:
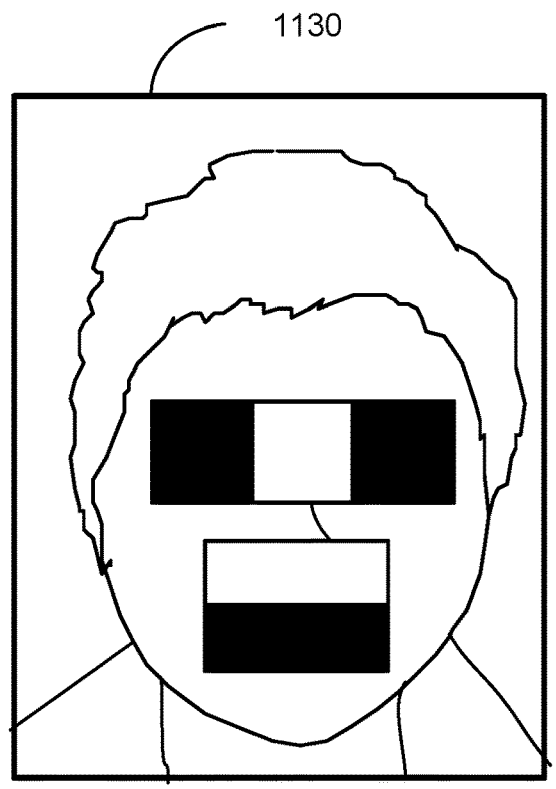
FIG. 11C illustrates identification of Haar features within the face in the image of FIG. 11A.
Figure 11D:
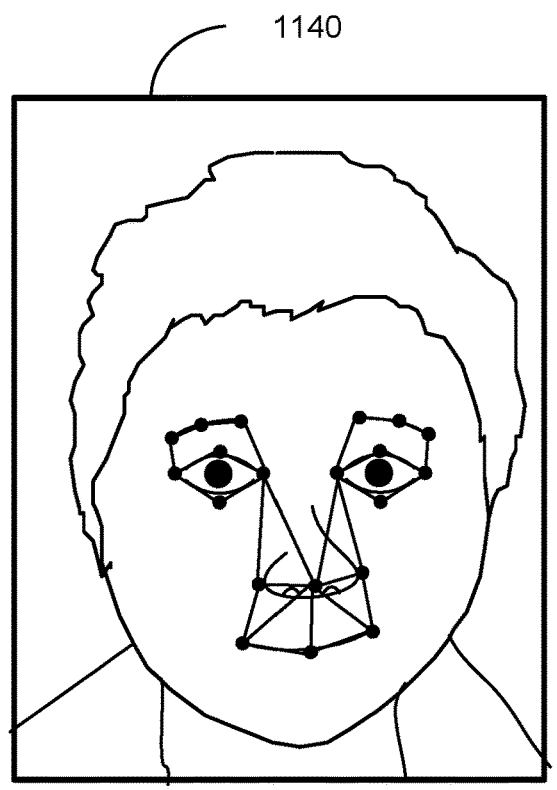
FIG. 11D illustrates identification of vector features within the face in the image of FIG. 11A.

FIG. 11A-FIG. 11D illustrate identification of features within a face in an image. In the context of landmark detection engine 214, the features illustrated in FIG. 11A-FIG. 11D may be landmarks/landmark features. In particular, image 1110 of FIG. 11A is a portrait image including a face. Image 1120 of FIG. 11B is the image 1110, but with circled "x" markings at different point-based landmark features, such as each of the corners of the two eyes of the face, each of the centers/pupils/irises of the two eyes of the face, a tip of the nose, each side or nostril of the nose, each corner of the mouth, the tip of the chin and the widow's peak of the hair. Image 1130 of FIG. 11C is the image 1110, but with Haar features in which average pixel values for seven regions of the face indicate that the regions for each eye and the mouth are darker while the regions for the nose bridge, nose tip, and each cheek are brighter. Image 1140 of FIG. 11D is the image 1110 but with vector features tracing and connecting certain lines and curves of the face around the eyes, eyebrows, nose, and mouth.

Returning to FIG. 2, one illustrative example of landmark detection is based on a cascade of regressors method. Using such a method in face recognition, for example, a cascade of regressors can be learned from faces with labeled landmarks. A combination of the outputs from the cascade of the regressors provides accurate estimation of landmark locations. The local distribution of features around each landmark can be learned and the regressors will give the most probable displacement of the landmark from the previous regressor's estimate. Further details of a cascade of regressors method is described in V. Kazemi and S. Josephine, "One millisecond face alignment with an ensemble of regression trees," CVPR, 2014, which is hereby incorporated by reference, in its entirety and for all purposes. The landmark detection engine may also start with a loose template of where certain landmark features are expected to be found based on the type of object. Such a template for a face might identify general regions in which eyes and/or a nose and/or a mouth and/or ears might be expected in similar manners to those illustrated in FIG. 11A-FIG. 11D. Any other suitable landmark detection techniques can also be used by the landmark detection engine 214.

The object detection and recognition system 200 further includes an object normalization engine 216 for performing object normalization. Object normalization can be performed to align objects for better object recognition results. For example, the object normalization engine 216 can perform face normalization by processing an image to align and/or scale the faces in the image for better recognition results. One example of a face normalization method uses two eye centers as reference points for normalizing faces. The face image can be translated, rotated, and scaled to ensure the two eye centers are located at the designated location with a same size. A similarity transform can be used for this purpose. Another example of a face normalization method can use five points as reference points, including two centers of the eyes, two corners of the mouth, and a nose tip. In some cases, one or more of the landmarks used for reference points can be determined from facial landmark detection, and may therefore include one or more of the landmark features illustrated or discussed with respect to FIG. 11A-FIG. 11D.

In some cases, the illumination of the object images may also need to be normalized. One example of an illumination normalization method is local image normalization. With a sliding window be applied to an image, each image patch is normalized with its mean and standard deviation. The center pixel value is subtracted from the mean of the local patch and then divided by the standard deviation of the local patch. Another example method for lighting compensation is based on discrete cosine transform (DCT). For instance, the second coefficient of the DCT can represent the change from a first half signal to the next half signal with a cosine signal. This information can be used to compensate a lighting difference caused by side light, which can cause part of a face (e.g., half of the face) to be brighter than the remaining part (e.g., the other half) of the face. The second coefficient of the DCT transform can be removed and an inverse DCT can be applied to get the left-right lighting normalization.

The feature extraction engine 218 performs feature extraction, which is an important part of the object recognition process. An example of a feature extraction process is based on steerable filters. A steerable filter-based feature extraction approach operates to synthesize filters using a set of basis filters. For instance, the approach provides an efficient architecture to synthesize filters of arbitrary orientations using linear combinations of basis filters. Such a process provides the ability to adaptively steer a filter to any orientation, and to determine analytically the filter output as a function of orientation. In one illustrative example, a two-dimensional (2D) simplified circular symmetric Gaussian filter can be represented as:

$$G(x,y) = e^{-(x^2+y^2)},$$

where x and y are Cartesian coordinates, which can represent any point, such as a pixel of an image or video frame. The n-th derivative of the Gaussian is denoted as $G_n$, and the notation $(\ldots)^\theta$ represents the rotation operator. For example, $f^\theta(x,y)$ is the function $f(x,y)$ rotated through an angle $\theta$ about the origin. The x derivative of $G(x,y)$ is:

$$G_1^{0°} = \frac{\partial}{\partial x} G(x,y) = -2xe^{-(x^2+y^2)},$$

and the same function rotated 90° is:

$$G_1^{90°} = \frac{\partial}{\partial y} G(x,y) = -2ye^{-(x^2+y^2)},$$

where $G_1^{0°}$ and $G_1^{90°}$ are called basis filters since $G_1^\theta$ can be represented as $G_1^\theta = \cos(\theta) G_1^{0°} + \sin(\theta) G_1^{90°}$ and $\theta$ is arbitrary angle, indicating that $G_1^{0°}$ and $G_1^{90°}$ span the set of $G_1^\theta$ filters (hence, basis filters). Therefore, $G_1^{0°}$ and $G_1^{90°}$ can be used to synthesize filters with any angle. The $\cos(\theta)$ and $\sin(\theta)$ terms are the corresponding interpolation functions for the basis filters.

Steerable filters can be convolved with face images to produce orientation maps which in turn can be used to generate features (represented by feature vectors). For instance, because convolution is a linear operation, the feature extraction engine 218 can synthesize an image filtered at an arbitrary orientation by taking linear combinations of the images filtered with the basis filters $G_1^{0°}$ and $G_1^{90°}$. In some cases, the features can be from local patches around selected locations on detected faces (or other objects). Steerable features from multiple scales and orientations can be concatenated to form an augmented feature vector that represents a face image (or other object). For example, the orientation maps from $G_1^{0°}$ and $G_1^{90°}$ can be combined to get one set of local features, and the orientation maps from $G_1^{45°}$ and $G_1^{135°}$ can be combined to get another set of local features. In one illustrative example, the feature extraction engine 218 can apply one or more low pass filters to the orientation maps, and can use energy, difference, and/or contrast between orientation maps to obtain a local patch. A local patch can be a pixel level element. For example, an output of the orientation map processing can include a texture template or local feature map of the local patch of the face (or other object) being processed. The resulting local feature maps can be concatenated to form a feature vector for the face image (or other object image). Further details of using steerable filters for feature extraction are described in William T. Freeman and Edward H. Adelson, "The design and use of steerable filters," IEEE Transactions on Pattern Analysis and Machine Intelligence, 13(9): 891-906, 1991, and in Mathews Jacob and Michael Unser, "Design of Steerable Filters for Feature Detection Using Canny-Like Criteria," IEEE Transactions on Pattern Analysis and Machine Intelligence, 26(8):1007-1019, 2004, which are hereby incorporated by reference, in their entirety and for all purposes.

Postprocessing on the feature maps, such as Linear discriminant analysis (LDA) and/or Principal Component Analysis (PCA), can also be used to reduce the dimensionality of the feature size. In order to compensate for possible errors in landmark detection, a multiple scale feature extraction can be used to make the features more robust for matching and/or classification.

Other feature detection and dimensionality reduction methods and systems may alternately or additionally be employed, including edge detection, corner detection, blob detection, ridge detection, scale-invariant feature transform, autocorrelation, motion detection, optical flow, thresholding, blob extraction, template matching Hough transform, active contours, independent component analysis, Isomap, Kernel PCA, latent semantic analysis, Partial least squares, principal component analysis, multifactor dimensionality reduction, nonlinear dimensionality reduction, multilinear principal component analysis, multilinear subspace learning, semidefinite embedding, autoencoder, or combinations thereof. Examples of features that may be extracted from a face or other object are illustrated in and discussed with respect to FIG. 11 above.

The identification/verification engine 219 performs object identification and/or object verification. Object recognition can include object identification, object verification, both object identification and object verification, and/or other suitable operations. Face identification and verification is one example of object identification and verification. For example, face identification can be used to identify which person identifier (e.g., name, number, alphanumeric code, or other identifier) a detected and/or tracked face should be associated with, and face verification can be used to verify if the face belongs to the person to which the face is determined to belong. The same idea also applies to objects in general, where object identification identifies which object identifier a detected and/or tracked object should be associated with, and object verification verifies if the detected/tracked object actually belongs to the object with which the object identifier is assigned. Objects can be enrolled or registered in an enrolled database that contains known objects. For example, features (e.g., feature vectors) of known objects can be stored in the enrolled database. In one illustrative example, an owner of a camera containing the object detection and recognition system 200 can register the owner's face and faces of other trusted users. In another illustrative example, an owner of one or more security cameras containing the object detection and recognition system 200 can include a large database of register users that can be provided from any suitable source (e.g., law enforcement or other governmental agency, a private database of registered people, and/or other suitable source of known faces). The enrolled database can be located in the same device as the object detection and recognition system 200, or can be located remotely (e.g., at a remote server that is in communication with the system 200). The enrolled database can be used as a reference point for performing object identification and/or object verification. In one illustrative example, object identification and/or verification can be used to authenticate a user to the camera, to indicate an intruder or stranger has entered a scene monitored by the camera, and/or to perform any other suitable function.

Various issues exist when performing object recognition. For instance, performing object recognition using one type of feature descriptions can be difficult in some cases. In some examples, attempting to perform object recognition for detected objects that are small and/or blurry in the captured images can lead to rejection of the object recognition results, particularly when enrolled objects (e.g., in an enrolled database) that are compared to the detected objects are not small and/or are not blurry. As noted herein, objects can include faces, people, vehicles, and/or any other object of interest. Using faces as an illustrative example of objects, face recognition can be challenging for video surveillance systems or other camera-related systems due, at least in part, to the size and quality of the input faces changing dramatically. For instance, faces detected from video cameras of a video surveillance system (or other camera-based system) can be small and blurry. In one illustrative example, a face can be small when the person is a far distance from a camera. In other illustrative examples, a face can be blurry due to movement of the person's head and/or body, due to lighting conditions in the scene, and/or based on other factors. Enrolled faces stored in an enrolled database are typically clear and relatively large. Matching a set of clear and large objects to a small and blurry image of an object is difficult, and can lead to low recognition confidence scores. Such low confidence scores can lead to the object recognition results being rejected by the object detection and recognition system.

Techniques and systems are described for generating and using multi-resolution feature descriptions for objects. The multi-resolution feature descriptions can be used for performing object recognition. As noted above, objects can include faces, people, vehicles, animals, and/or any other object of interest. While many examples provided herein use faces as illustrative examples of objects, one of ordinary skill will appreciate that the techniques and systems described herein can be used to perform object recognition for any type of object. The techniques and systems can be implemented by the object detection and recognition system 200, or any other suitable system that can perform object recognition.

In some examples, the multi-resolution feature descriptions include a combination of two resolutions of object features, which can be used to recognize objects having different sizes. The multi-resolution feature descriptions can be generated for objects that are detected in images and that are to be enrolled in an enrolled database. The enrolled multi-resolution feature descriptions can then be used to perform object recognition (e.g., object identification and/or verification) for objects detected in one or more input images. For instance, an object (e.g., a face or other object) that is to be enrolled in an enrolled database can be detected in an image. The image can include a video frame, a still image, or other suitable image. The detected object can be represented as an object image that is a portion of the entire image (e.g., the portion of the entire image bounded by a bounding region, such as a bounding box or region having another suitable shape). For example, the object image can include a cropped portion of the entire image, with the cropped portion being defined by a bounding region generated for the detected object. The object image can be processed, and multi-resolution feature descriptions can be generated for the object for storage in an enrolled database.

In some examples, the object image can be normalized before the multi-resolution feature descriptions are generated. Normalization can include resizing the object image to a normalized scale and/or position based on feature landmarks detected for the object. In some cases, the object image can be further processed to normalize the distance between certain landmarks. For instance, using a face as an illustrative example of an object, the additional processing can be performed to normalize the distance between the centers of two eyes of the face, the distance between the centers of the two mouth corners of the face, and/or other two landmark features on the face. The first set of features can be extracted from the object image (using the feature extraction techniques described above) after the object image is normalized. The object features from the first set of features are considered to have high resolutions, and are referred to herein as high resolution features. The set of high resolution features can include one or more features representing the object.

The normalized object image can be modified by changing properties of the image. A second set of features can then be extracted from the modified object image. In one illustrative example, pixel values of the normalized object image can be modified by applying a low pass filter to the image before extracting the second set of features. In some cases, the low pass filtered image can be downsampled and then upsampled before extracting the second set of features. The low pass filter may be a Gaussian filter. The object features from the second set of features are considered to have low resolutions that are lower than the first set of features, and are referred to herein as low resolution features. The set of low resolution features can include one or more features representing the object. The high resolution and low resolution features can be stored as enrolled features in an enrolled database. In some cases, the high resolution and low resolution features can be combined for storage in the enrolled database. For example, the values of the high resolution features and the values of the low resolution features can be concatenated so that the concatenated values can be stored in a same location in the enrolled database.

The high resolution features need not all have a same single high resolution—instead, they may all fall within a same range of high resolutions, such as resolutions exceeding a particular threshold resolution. Similarly, the low resolution features need not all have a same single low resolution—instead, they may all fall within a same range of low resolutions, such as resolutions falling below a particular threshold resolution. The range of low resolutions may this include at least one resolution that is lower than any included in the range of high resolutions, and with the range of high resolutions may include at least one resolution that is higher than any included in the range of low resolutions. In some cases, normalization may be omitted so that it is not performed before the multi-resolution feature descriptions are generated. In such cases when normalization is not performed, the high resolution features may not have the same single high resolution, and the low resolution features may not all have a same single low resolution. In some cases, when normalization is performed, the high resolution features may or may not have the same single high resolution, and the low resolution features may or may not all have a same single low resolution.

In some cases, multi-resolution feature descriptions may include more than two sets of features. For example, an image of an object—whether an enrolled image or a captured input image—can be used to extract a set of high resolution features, generate a set of medium resolution features with lower resolution than the high resolution features, and generate a set of low resolution features with lower resolution than the medium resolution features. More intermediate resolutions of features may also be generated in addition to the medium resolution features (e.g., high medium, low medium).

As discussed above with respect to FIG. 2, the features can be transformed pixel values of image patches filtered with steerable filters, Gabor filters, or other suitable type of filter. For instance, each patch is an image block around a landmark of an object (e.g., a landmark of a face or other suitable object). An object feature for the entire object (e.g., for the entire face) can be a set of local feature vectors, with each local feature vector being a feature vector from an individual patch of the object. Combined together, the local feature vectors (for the different patches) make up the object feature vector of the object. Image 1140 of FIG. 11D provides an example.

Multi-resolution feature descriptions can also be generated for objects detected in one or more captured input images, which can be compared to the enrolled multi-resolution features for object recognition purposes. For example, the object detection and recognition system 200 can receive an input image, and can detect one or more objects in the input image. One or more landmarks of the one or more objects can be detected using the landmark detection techniques described above. An inter-landmark distance between two or more of the landmark features of an object can be determined, and can be used to determine whether to extract high resolution features or low resolution features for the object detected in the input image, and also whether to analyze the detected object using high resolution enrolled features or low resolution enrolled features. For example, the inter-landmark distance can indicate the size of the object, which can be used to determine whether high resolution or low resolution features will be used for performing object recognition for the object. In one illustrative example, the inter-landmark distance for an object that is a person's face can be an inter-eye distance between a person's eyes. Any of the other features illustrated in or discussed with respect to FIG. 11A-FIG. 11D, or any other landmarks or features of a face, may be used as landmarks between which to determine inter-landmark distance for faces. Any other suitable inter-landmark distance can be used to determine the size of a detected object.

If the inter-landmark distance for the object is greater than a size threshold, high resolution features can be extracted for the object and the high resolution features from the stored enrolled features can be used for performing the object recognition. For example, high resolution features can be extracted from the object image of the object in the input image currently being processed, and the extracted high resolution features can be matched against enrolled high resolution features of various objects in the enrolled database. If the inter-landmark distance for the object is not greater than the size threshold, low resolution features can be extracted for the object and the low resolution features from the stored enrolled features can be used for performing the object recognition. For example, low resolution features can be extracted from the object image of the object in the input image, and can be matched against enrolled low resolution features of the various objects in the enrolled database. The size threshold may be pre-determined or may be based on an average inter-landmark distance in a set of detected or enrolled objects.

Figure 5:
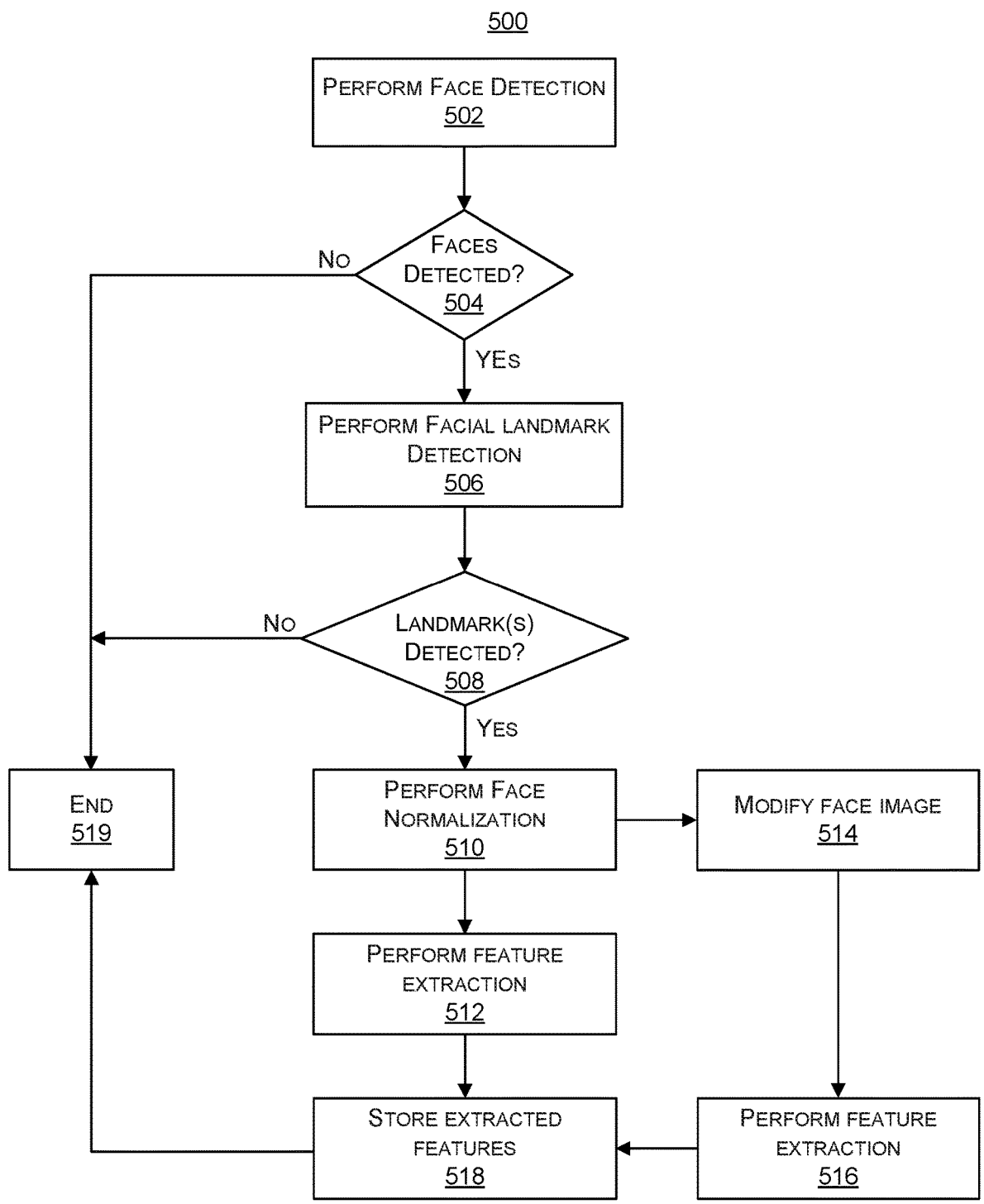
FIG. 5 is a flowchart illustrating an example of a process of determining multi-resolution feature descriptions for objects being enrolled in an enrolled database, in accordance with some examples.

FIG. 5 is a flowchart illustrating an example of a process 500 of determining multi-resolution feature descriptions for objects being enrolled in an enrolled database. The steps of process 500 are described using faces as illustrative examples of objects. However, one of ordinary skill will appreciate that the process 500 can be performed for any type of object. At each iteration, the process 500 can include receiving an input image that will be processed for enrolling one or more faces detected in the input image. The input image can include a video frame of a video sequence of video frames, a still image, or other suitable image. At block 502, the process 500 includes performing face detection to detect one or more faces in the input image. In one illustrative example, the face detection can be performed by the object detection engine 210 using the object detection operations described above with respect to FIG. 1 and FIG. 2 in order to detect the one or more faces in the input image. The one or more detected faces can be represented using bounding boxes (or other bounding regions). A detected face (or other object) can be processed using only the video data of the image that is within a bounding box generated for the detected face (or other object).

At block 504, the process 500 can determine whether one or more faces are detected in the input image. If no faces are detected for the input image, the process 500 ends at block 519. Once the process ends for a current iteration, the process 500 can be performed for a next image (e.g., a next video frame of a video sequence). If, at block 504, it is determined that one or more faces are detected for the input image, the process 500 performs facial landmark detection at block 506. In one illustrative example, the landmark detection can be performed by the landmark detection engine 214 using the landmark detection operations described above with respect to FIG. 1 and FIG. 2 in order to detect one or more facial landmarks for each face detected in the input image. The facial landmarks can include any suitable features on the face, such as eyes, nose (e.g., the tip of the nose), mouth (e.g., the two corners of the mouth), among other possible features.

At block 508, the process 500 can determine whether one or more landmarks are detected for each face detected in the input image. If no landmarks are detected for a given face, the process 500 can determine whether there are any landmarks detected for a next face detected in the image (if one exists). If no landmarks are detected for all of the faces detected in the image, the process 500 ends at block 519. The process 500 can then be performed for a next image (e.g., a next video frame of a video sequence). If, at block 508, it is determined that one or more landmarks are detected for at least one face detected in the input image, the process 500 performs face normalization at block 510 for each face for which one or more landmarks were detected. In some cases, after face detection and landmark detection are performed for a face, an inter-eye distance (IED) can be determined for the face by measuring the distance between the centers of the eyes of the face. The IED can be used to indicate the size of the face. In some examples, the IED can be used for various purposes during the enrollment stage. In some cases, in some cases, during the enrollment and recognition stages, the IED can be used to check if a face is large enough to be recognized. For instance, if the IED for a given face is less than a threshold size, the face can be discarded. The threshold size can be set to any suitable amount. In one illustrative example, if the IED<30, then the face can be discarded. In some examples, the IED can also be used to normalize the face size.

In some cases, each of the input faces for enrollment are normalized to an N×N image, which can be the size of a face template. The normalization can be performed by the object normalization engine 216. Normalization of the face image can include scaling the size of the face image to the N×N size, and aligning (e.g., by rotating and translating the image) features of the detected face with features of the face template. In one illustrative example, the face normalization can be based on a 5-point face scaling and alignment method. For instance, the five points can include the centers of the two eyes of the face, the nose tip, and the two corners of mouth. The five points can be represented using one or more pixels that correspond to the given point (e.g., pixels for the two points corresponding to the eye centers, a pixel corresponding to the nose tip, and pixels for the two mouth corners). The five points can be used for face alignment to scale and align the five features of the detected face with five corresponding features of the face template. For example, the face image can be scaled, rotated, and translated until the features are aligned.

In some cases, a similarity transform can be used to align the given five points of the detected face to five predefined points of the face template. The similarity transform can include scaling, rotating, and translating of the input face image to align or register the landmark features of the face image to the landmark features of the face template. In some cases, the similarity transform can include a rotation matrix, a translation matrix and/or translation vectors, and/or a scaling factor, which can be combined to get the similarity transform matrix. The similarity transform can be based on a pinhole camera model used to determined extrinsic camera parameters (e.g., sometimes used for camera calibration). For instance, a joint rotation-translation matrix (sometimes referred to as a transformation matrix having extrinsic parameters) can be used to translate coordinates of a point to a coordinate system that is fixed with respect to the camera.

In some examples, the least-squares method can be used to determine the parameters for the similarity transform. For example, assuming the transformation matrix is P, X are the coordinates of landmarks in the original face image, and Y=PX is the similarity transform (simplified for explanation). The term Y' is the corresponding point on the target plane (registered locations). The equation $\|Y'-PX\|$ can then be minimized to find the best P, which can be solved using the least squares fitting method.

The similarity transform parameters can then be used to determine which pixel location in the original face image to use for each pixel location in the normalized image. For example, the transformation matrix can be multiplied by a pixel location in the normalized image to get the coordinate of the pixel location in the original image whose value will be used for the pixel location in the normalized image. In such an example, for each pixel location in the normalized image, the parameters of the transformation matrix can be used to determine the pixel location in the original face image to use for that pixel location in the normalized image. Other alignment or registration techniques other than a similarity transform can also be used, such as a Lucas-Kanade based approach, a model based approach (e.g., Active Appearance Model (AAM), Constrained Local Model (CLM), or the like), or other suitable technique.

Because the pixel locations in the original input image determined by the similarity transform may be at floating points (not at integer positions in the image), bilinear interpolation can be used to interpolate the floating point pixels values for use in the normalized image. For example, bilinear interpolation can be used to determine the value at the floating point location (determined using the transform parameters) of the original input image. The bilinear interpolated value from the input image can then be used for the pixel location in the normalized image. Bilinear interpolation includes performing linear interpolation first in one direction, and then again performing linear interpolation in another direction. In one illustrative example, a floating point pixel location surrounded by four pixel locations with known pixel values can be determined by performing two linear interpolation functions. A first linear interpolation can be performed in the horizontal direction between the top two pixels and between the bottom two pixels to determine two intermediate values (one intermediate value between the top two pixels and one intermediate value between the bottom two pixels). The intermediate value can be an average of the two pixel values being used for the interpolation. For example, if the top two pixels have values of 100 and 200, respectively, the intermediate value can be interpolated to be 150. A bilinear interpolated value for the floating point location can then be determined by performing a second linear interpolation between the two intermediate values. One of ordinary skill will appreciate that the bilinear interpolation can be implemented first by performing the linear interpolation in the vertical direction to obtain two intermediate values between the two left pixels and the two right pixels, and then performing a second linear interpolation between the two intermediate values.

In some cases, the face image can be further processed (after the 5-point face alignment or other suitable alignment or registration is performed) to normalize the distance between the centers of the two eyes and the centers of the two mouth corners. Such further processing can be performed because, as a person turns their head from the frontal position to the right or left, the distance between the eyes and the mouth appears to change due to the perspective of the camera. The additional processing can be used to further normalize the distance between the eyes in the input image to the distance between the eyes of the face template, and to further normalize the distance between the mouth corners in the input image to the distance between the mouth corners of the face template.

The normalized face image can be denoted as $I_1$. At block 512, the process 500 performs feature extraction to extract features (denoted as high resolution features $F_1$) from each of the normalized face images $I_1$. In one illustrative example, the feature extraction can be performed by the feature extraction engine 218 using the feature extraction operations described above with respect to FIG. 1 and FIG. 2 in order to extract the high resolution features $F_1$ for each face detected in the input image.

At block 514, the process 500 can modify the normalized face image $I_1$. For example, the normalized face image $I_1$ can be low pass filtered (e.g., with a Gaussian filter or other suitable low pass filter). The low pass filter filters out one or more high frequency components of the image (e.g., edges and other high gradient features of the image) and retains low frequency components, resulting in a smoothed and/or blurry image. In some cases, the filtered face image can then be downsampled to a reduced size image $I_2$. In one illustrative example, the reduced size image $I_2$ includes an $$\frac{N}{2} \times \frac{N}{2}$$

image. The reduced size image $I_2$ can then be upsampled again to an N×N image $I_3$ using bilinear interpolation to determine the pixel values of the N×N image $I_3$ from the reduced size image $I_2$. In such cases, the additional downsampling and upsampling steps can be used to remove more details (e.g., detailed edges) from the face image, which, in some instances, can provide better results than applying only a low pass filter to the face image.

At block 516, the process 500 performs feature extraction to extract features (denoted as low resolution features $F_3$) from each N×N image $I_3$ (after filtering, downsampling, and upsamping). In some cases, the low resolution features $F_3$ can be extracted from the low pass filtered image (without performing downsampling and then upsampling of the low pass filtered image). As noted above, the feature extraction can be performed by the feature extraction engine 218 using the feature extraction operations described above with respect to FIG. 1 and FIG. 2 in order to extract the low resolution features $F_3$.

At block 518, the high resolution features $F_1$ extracted from $I_1$ and the low resolution features $F_3$ extracted from $I_3$ (or from the low pass filtered image) are stored in the enrolled database for matching purposes. Using such techniques, the enrolled face images will have two sets of features, including high resolution features $F_1$ and low resolution features $F_3$. The high resolution features $F_1$ and low resolution features $F_3$ of a face can be combined and stored in a same location in the enrolled database. For example, the values of the low resolution features $F_3$ can be concatenated with the values of the high resolution features $F_1$. As noted previously, the extracted features of a face can be represented using a feature vector. The combined values of the feature vectors for the high resolution features and the low resolution features can be stored in the enrolled database. After storing the extracted high resolution features $F_1$ and low resolution features $F_3$ for each detected face, the process 500 ends at block 519. The process 500 can then be performed for a next image. As described in more detail below with respect to FIG. 6, the high resolution features $F_1$ from $I_1$ can be used to match high resolution face images during object recognition, and the features $F_3$ from $I_3$ can be used to match low resolution face images.

Figure 6:
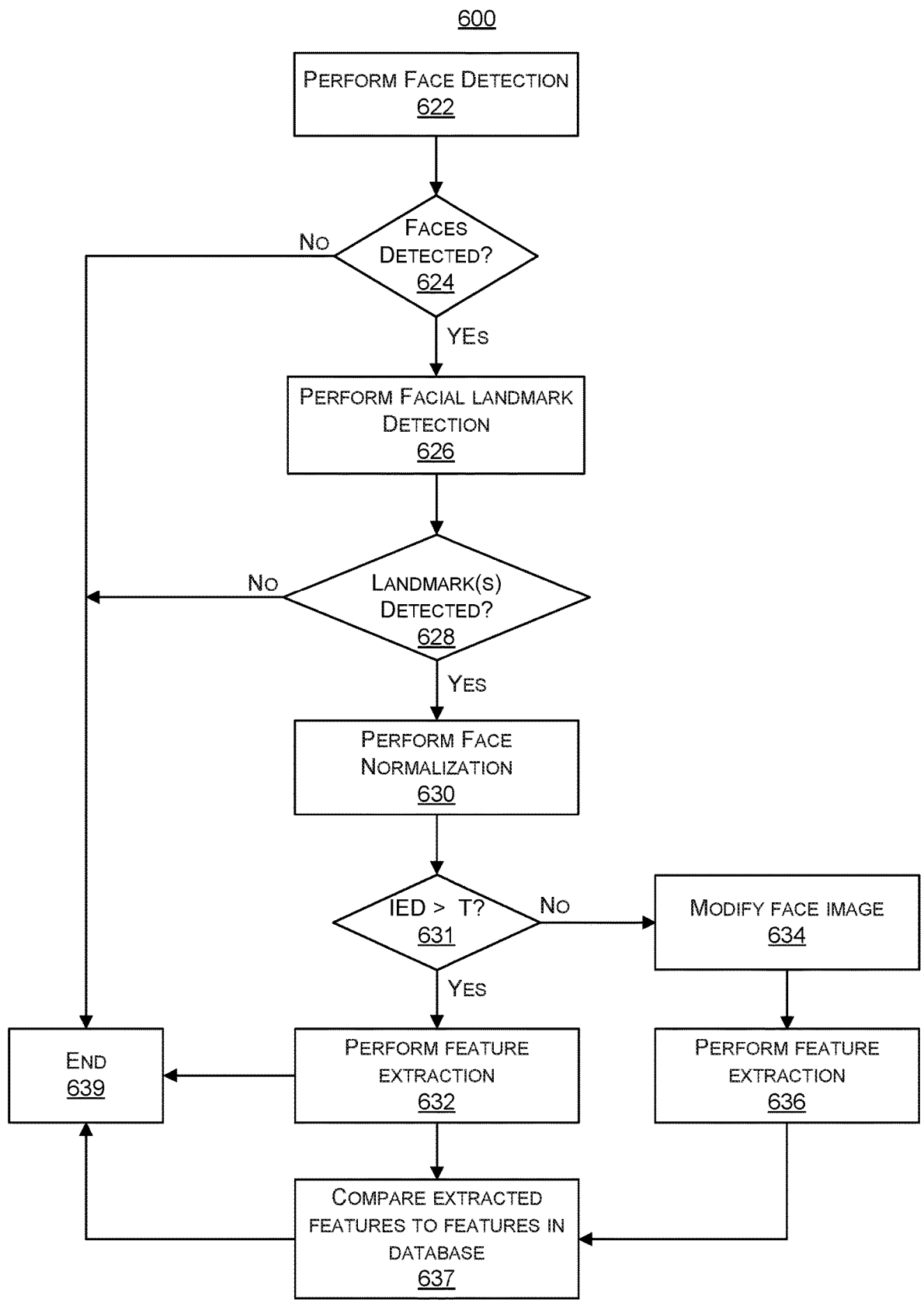
FIG. 6 is a flowchart illustrating an example of a process of determining multi-resolution feature descriptions for objects detected in one or more input images, in accordance with some examples.

FIG. 6 is a flowchart illustrating an example of a process 600 of determining multi-resolution feature descriptions for objects detected in one or more input images. The steps of process 600 are described using faces as illustrative examples of objects. However, one of ordinary skill will appreciate that the process 600 can be performed for any type of object. At each iteration, the process 600 can include receiving an input image that will be processed for face recognition purposes. The input image can include a video frame of a video sequence of video frames, a still image, or other suitable image. At block 622, the process 600 includes performing face detection to detect one or more faces in the input image. In one illustrative example, the face detection can be performed by the object detection engine 210 using the object detection operations described above with respect to FIG. 1 and FIG. 2 in order to detect the one or more faces in the input image. The one or more detected faces can be detected as bounding boxes (or other bounding regions). A detected face (or other object) can be processed using only the video data of the image that is within a bounding box generated for the detected face (or other object).

At block 624, the process 600 can determine whether one or more faces are detected in the input image. If no faces are detected for the input image, the process 600 ends at block 639. The process 600 can then be performed for a next image (e.g., a next video frame of a video sequence). If the process 600 determines, at block 624, that one or more faces are detected for the input image, facial landmark detection is performed at block 626. In one illustrative example, the landmark detection can be performed by the landmark detection engine 214 using the landmark detection operations described above with respect to FIG. 1 and FIG. 2 in order to detect one or more landmarks for each face detected in the input image. The landmarks can include any suitable features on the face, such as eyes, nose (e.g., the tip of the nose), mouth (e.g., the two corners of the mouth), among other possible features. For example, the same landmark features that were determined during the enrollment phase (using process 500) can be determined at block 626.

At block 628, the process 600 can determine whether one or more landmarks are detected for each face detected in the input image. If no landmarks are detected for a given face, the process 600 can determine whether there are any landmarks detected for a next face detected in the image (if one exists). If no landmarks are detected for all of the faces detected in the image, the process 600 ends at block 639. The process 600 can then be performed for a next image (e.g., a next video frame of a video sequence). If the process 600 determines, at block 628, that one or more landmarks are detected for at least one face detected in the input image, face normalization is performed at block 630 for each face for which one or more landmarks were detected. The normalization operations performed at block 630 can be the same normalization operations as those described above with respect to block 510 of FIG. 5. For example, the input face image can be normalized to generate an N×N image (e.g., using the 5-point scaling and alignment method, or other suitable method).

After face detection and landmark detection are performed for a face, an inter-eye distance (IED) can be determined for the face by measuring the distance between the centers of the eyes of the face. One of ordinary skill will appreciate that any other inter-landmark distance can be used other than the IED, such as a distance between mouth corners, a distance between the ears, or other suitable inter-landmark distance. In some cases, given an input face image, the original IED can be measured from the original input image (before normalization is performed). The IED can indicate the size of the face in the image. At block 631, the process 600 determines whether the measured IED is greater than a size threshold (denoted as T). The size threshold T can be used to determine the resolution of features to be used for performing face recognition for the detected face. For example, if it is determined at block 631 that the measured IED is greater than (or equal to in some cases) than T (denoted as IED≥T), indicating the face is large enough to obtain high quality features, the process 600 can perform feature extraction on the normalized face image to extract high resolution features $F_1$. In one illustrative example, the feature extraction can be performed by the feature extraction engine 218 using the feature extraction operations described above with respect to FIG. 1 and FIG. 2 in order to extract the high resolution features $F_1$. The high resolution features $F_1$ for the face can then be matched against high resolution features of the faces stored in the enrolled database in order to recognize the face.

At block 631, if it is determined that the measured IED is less than T (denoted as IED<T) or is not greater than T, indicating the face is small enough that low resolution features should be extracted, the face image will be processed at block 634 to get a modified image $I_3$. Low resolution features $F_3$ can then be extracted at block 636 from the modified image $I_3$. The process 600 can modify the image at block 634 using the operations described above with respect to block 514 of FIG. 5. For example, the image can be modified by low pass filtering the image (e.g., with a Gaussian filter or other suitable low pass filter). By filtering out one or more high frequency components of the image and retaining low frequency components, a smoothed and/or blurred image can be generated. As described above, in some cases, the filtered face image can be downsampled to a reduced size image $I_2$ $$\left(\text{e.g., an } \frac{N}{2} \times \frac{N}{2} \text{ image}\right),$$

and the reduced size image $I_2$ can then be upsampled again to an N×N image $I_3$ using bilinear interpolation. At block 636, the process 600 performs feature extraction to extract low resolution features $F_3$ from each N×N image $I_3$ or from the low pass filtered N×N image (without downsampling and then upsampling the low pass filtered image). The low resolution feature extraction can be performed by the feature extraction engine 218 using the feature extraction operations described above with respect to FIG. 1 and FIG. 2. The low resolution features $F_3$ can then be matched against low resolution features of various faces stored in the enrolled database in order to recognize the face.

Using the systems and techniques described herein, multi-resolution feature descriptions can be generated, allowing low resolution input images to be matched with low resolution enrolled features, and high resolution input images can be matched with high resolution enrolled features. Using the multi-resolution features, the matching accuracy can be greatly improved for low resolution input images. For example, the recognition rate can be improved by allowing small faces to be more accurately recognized by the object detection and recognition system 200, while processing speed can be kept the same.

Figure 7:
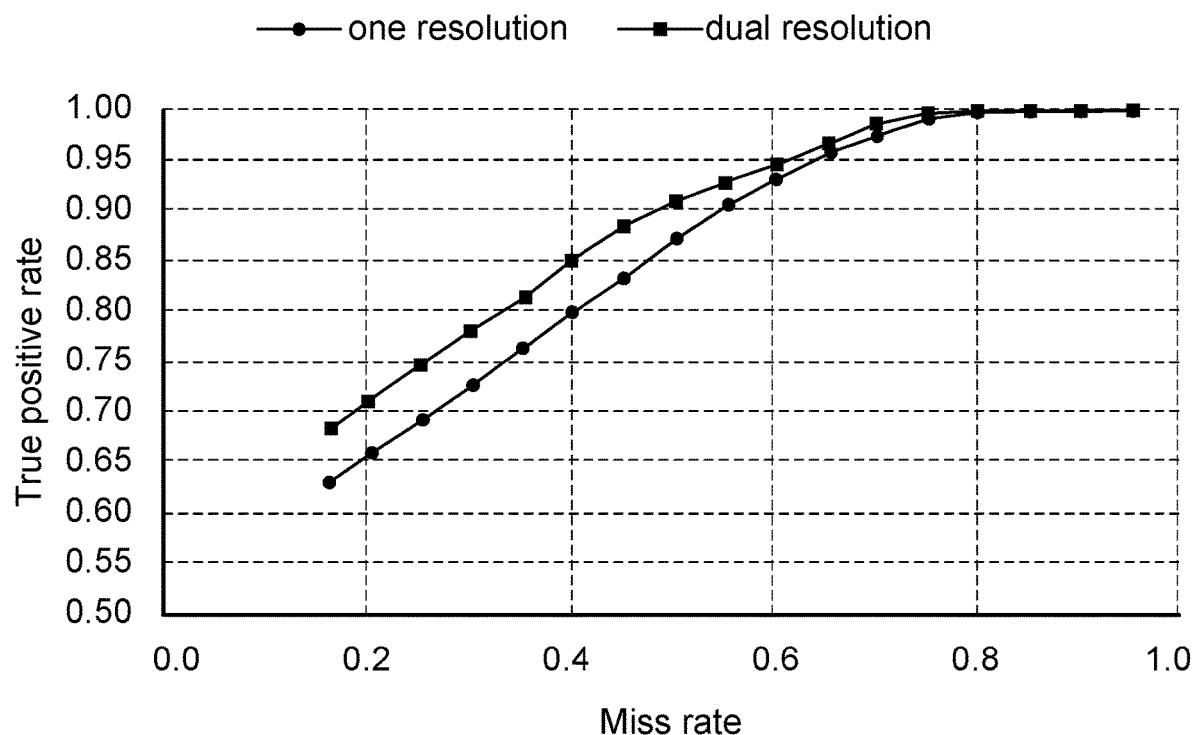
FIG. 7 is a graph illustrating an example of a comparison of true positive rate of single resolution-based object recognition versus dual resolution-based object recognition.

FIG. 7 is a graph illustrating the miss rate relative to the true positive rate for object recognition using single resolution feature descriptions versus dual resolution feature descriptions. As shown in the graph, experiments show that, with the dual resolution feature extraction and matching described above, the matching rate for smaller faces has been improved, and more smaller faces can be recognized from the face detection and recognition system 200.

Figure 8:
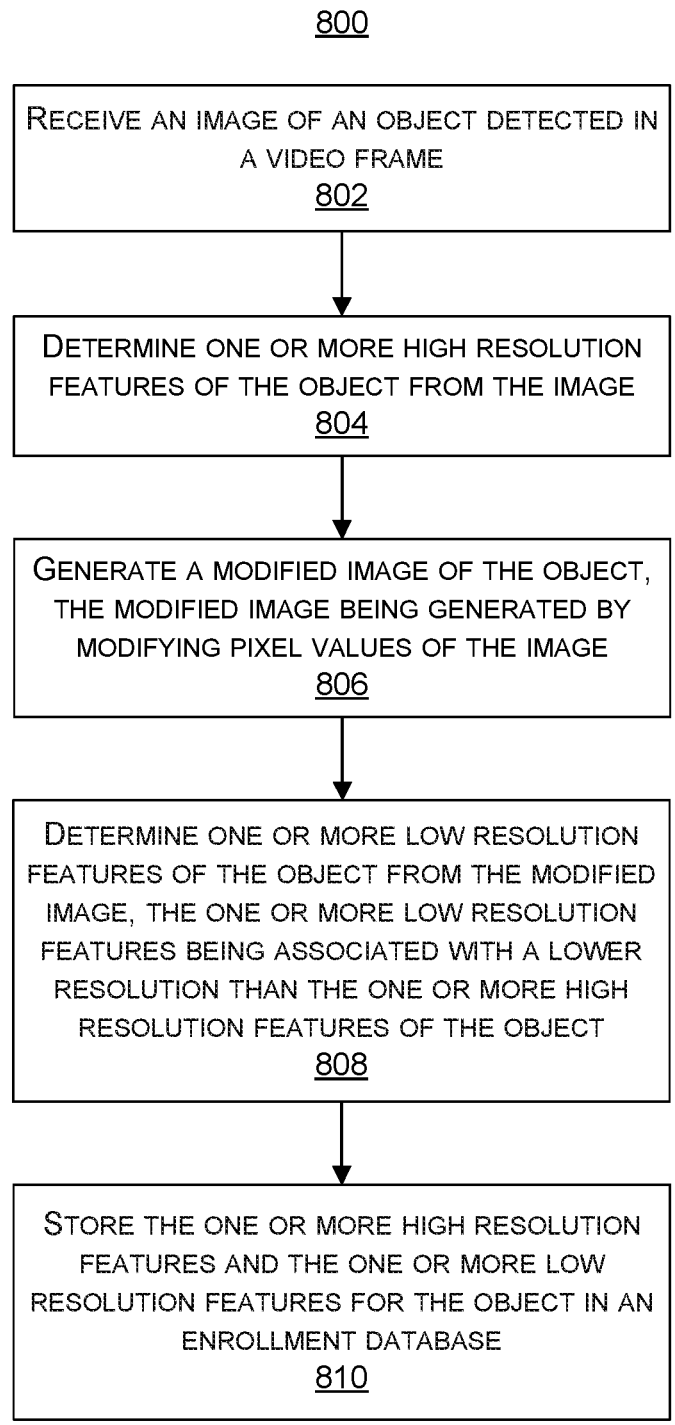
FIG. 8 is a flowchart illustrating an example of a process of determining features for one or more objects in one or more video frames, in accordance with some embodiments.

FIG. 8 is a flowchart illustrating an example of a process 800 of determining features for one or more objects in one or more video frames using the techniques described herein. The process 800 can be used to determine features for objects being enrolled in an enrolled database. At block 802, the process 800 includes receiving an image of an object detected in a video frame. In some aspects, the object includes a face or other object of interest. In some examples, the process 800 can include normalizing the image of the object. For example, normalizing the image can include scaling the image of the object and aligning one or more landmark features determined for the object with one or more landmark features of an object template.

At block 804, the process 800 includes determining one or more high resolution features of the object from the image. In some cases, the high resolution features can be determined from the normalized image of the object.

At block 806, the process 800 includes generating a modified image of the object. The modified image is generated by modifying pixel values of the image. At block 808, the process 800 includes determining one or more low resolution features of the object from the modified image. The one or more low resolution features are associated with a lower resolution than the one or more high resolution features of the object. In some cases, generating the modified image of the object can include generating a filtered image using a low pass filter. The low pass filter filters out one or more high frequency components of the image. In some examples, the low pass filter includes a Gaussian filter or other suitable low pass filter. Generating the modified image of the object can further include generating a downsampled image by downsampling the filtered image, and generating an upsampled image by upsampling the downsampled image. Upsampling the downsampled image can include performing interpolation using pixel values of the downsampled image. The one or more low resolution features of the object can then be determined using the upsampled image.

At block 810, the process 800 includes storing the one or more high resolution features and the one or more low resolution features for the object in an enrolled database. In some aspects, the one or more high resolution features and the one or more low resolution features of the object include one or more representative feature vectors.

The high resolution and low resolution features of the object in the enrolled database can be used for comparison against high resolution and low resolution features of unknown objects in one or more input video frames. For instance, in some examples, the process 800 includes receiving an additional image of an unknown object detected in an additional video frame, and determining a size of the unknown object detected in the additional video frame. In one illustrative example, the unknown object detected in the additional video frame can be a face, in which case the size of the face can be determined based on an inter-eye distance between eyes of the face in the video frame. The process 800 can determine, based on the size of the unknown object, whether to determine one or more high resolution features for the unknown object or one or more low resolution features for the unknown object. For example, the one or more high resolution features are determined for the unknown object when the size of the unknown object is greater than a size threshold, and the one or more low resolution features are determined for the unknown object when the size of the unknown object is not greater than (or is less than or equal to) the size threshold. The one or more low resolution features of the unknown object are associated with a lower resolution than the one or more high resolution features of the unknown object. The process 800 can determine an identity of the unknown object in the additional video frame as being a same identity as the object detected in the video frame.

In some cases, the process 800 can include determining the size of the unknown object is greater than a size threshold, and determining the one or more high resolution features for the unknown object based on the size of the unknown object being greater than the size threshold. In such cases, determining the identity of the unknown object in the additional video frame is the same identity as the object detected in the video frame includes obtaining high resolution features of a plurality of objects from the enrolled database, comparing the one or more high resolution features of the unknown object to the high resolution features of the plurality of objects from the enrolled database, and determining the one or more high resolution features of the unknown object match the one or more high resolution features of the object.

In some aspects, the process 800 can include determining the size of the unknown object is not greater than a size threshold, and determining the one or more low resolution features for the unknown object based on the size of the unknown object not being greater than the size threshold. In such cases, determining the identity of the unknown object in the additional video frame is the same identity as the object detected in the video frame includes obtaining low resolution features of a plurality of objects from the enrolled database, comparing the one or more low resolution features of the unknown object to the low resolution features of the plurality of objects from the enrolled database, and determining the one or more low resolution features of the unknown object match the one or more low resolution features of the object.

While the process 800 focuses on determining high-resolution features at block 804 and low-resolution features at block 808, other feature variations may alternately or additionally be generated by changing how the image is modified in block 806. For example, in block 806, various image parameters may be modified, such as brightness, contrast, saturation, gamma, sharpness, levels, color, hue, color balance, combinations thereof, or the other parameters.

Figure 9:
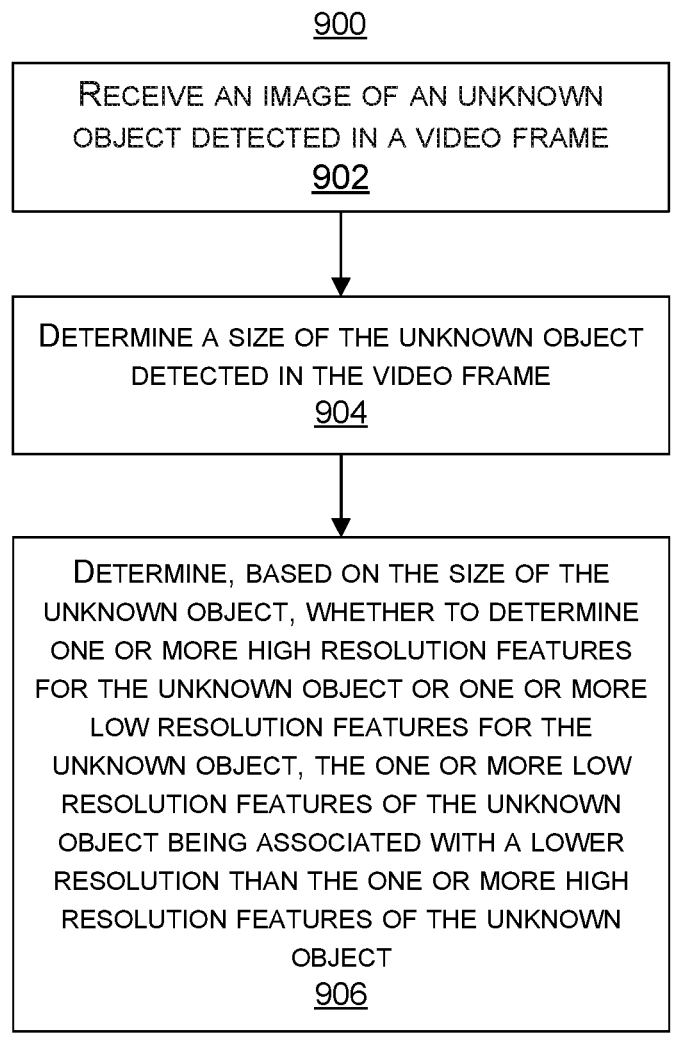
FIG. 9 is a flowchart illustrating another example of a process of determining features for one or more objects in one or more video frames, in accordance with some embodiments.

FIG. 9 is a flowchart illustrating an example of a process 900 of determining features for one or more unknown objects in one or more video frames using the techniques described herein. At block 902, the process 900 includes receiving an image of an unknown object detected in a video frame. In some aspects, the unknown object includes a face or other object of interest.

At block 904, the process 900 includes determining a size of the unknown object detected in the video frame. In one illustrative example, the unknown object detected in the video frame can be a face, in which case the size of the face can be determined based on an inter-eye distance between eyes of the face in the video frame.

At block 906, the process 900 includes determining, based on the size of the unknown object, whether to determine one or more high resolution features for the unknown object or one or more low resolution features for the unknown object. For example, the one or more high resolution features are determined for the unknown object when the size of the unknown object is greater than a size threshold, and the one or more low resolution features are determined for the unknown object when the size of the unknown object is not greater than (or is less than or equal to) the size threshold. The one or more low resolution features of the unknown object being associated with a lower resolution than the one or more high resolution features of the unknown object. In some cases, the one or more high resolution features and the one or more low resolution features of the object include one or more representative feature vectors.

In some aspects, the process 900 includes normalizing the image of the unknown object. Normalizing the image includes scaling the image of the unknown object and aligning one or more landmark features determined for the unknown object with one or more landmark features of an object template. In some cases, the high resolution features can be determined from the normalized image of the object.

In some examples, the process 900 includes generating a modified image of the unknown object. The modified image is generated by modifying pixel values of the image (or the normalized image). In such examples, the one or more low resolution features of the unknown object are determined from the modified image. In some cases, generating the modified image of the unknown object can include generating a filtered image using a low pass filter. The low pass filter filters out one or more high frequency components of the image. In some examples, the low pass filter includes a Gaussian filter or other suitable low pass filter. Generating the modified image of the unknown object can further include generating a downsampled image by downsampling the filtered image, and generating an upsampled image by upsampling the downsampled image. Upsampling the downsampled image can include performing interpolation using pixel values of the downsampled image. The one or more low resolution features of the unknown object can then be determined using the upsampled image.

The process 900 can further include determining an identity of the unknown object in the additional video frame as being a same identity as an object from an enrolled database.

In some cases, the process 900 can include determining the size of the unknown object is greater than a size threshold, and determining the one or more high resolution features for the unknown object based on the size of the unknown object being greater than the size threshold. In such cases, determining the identity of the unknown object in the additional video frame is the same identity as the object from the enrolled database includes obtaining high resolution features of a plurality of objects from the enrolled database, comparing the one or more high resolution features of the unknown object to the high resolution features of the plurality of objects from the enrolled database, and determining the one or more high resolution features of the unknown object match the one or more high resolution features of the object.

In some aspects, the process 900 can include determining the size of the unknown object is not greater than a size threshold, and determining the one or more low resolution features for the unknown object based on the size of the unknown object not being greater than the size threshold. In such cases, determining the identity of the unknown object in the additional video frame is the same identity as the object from the enrolled database includes obtaining low resolution features of a plurality of objects from the enrolled database, comparing the one or more low resolution features of the unknown object to the low resolution features of the plurality of objects from the enrolled database, and determining the one or more low resolution features of the unknown object match the one or more low resolution features of the object.

Figure 10:
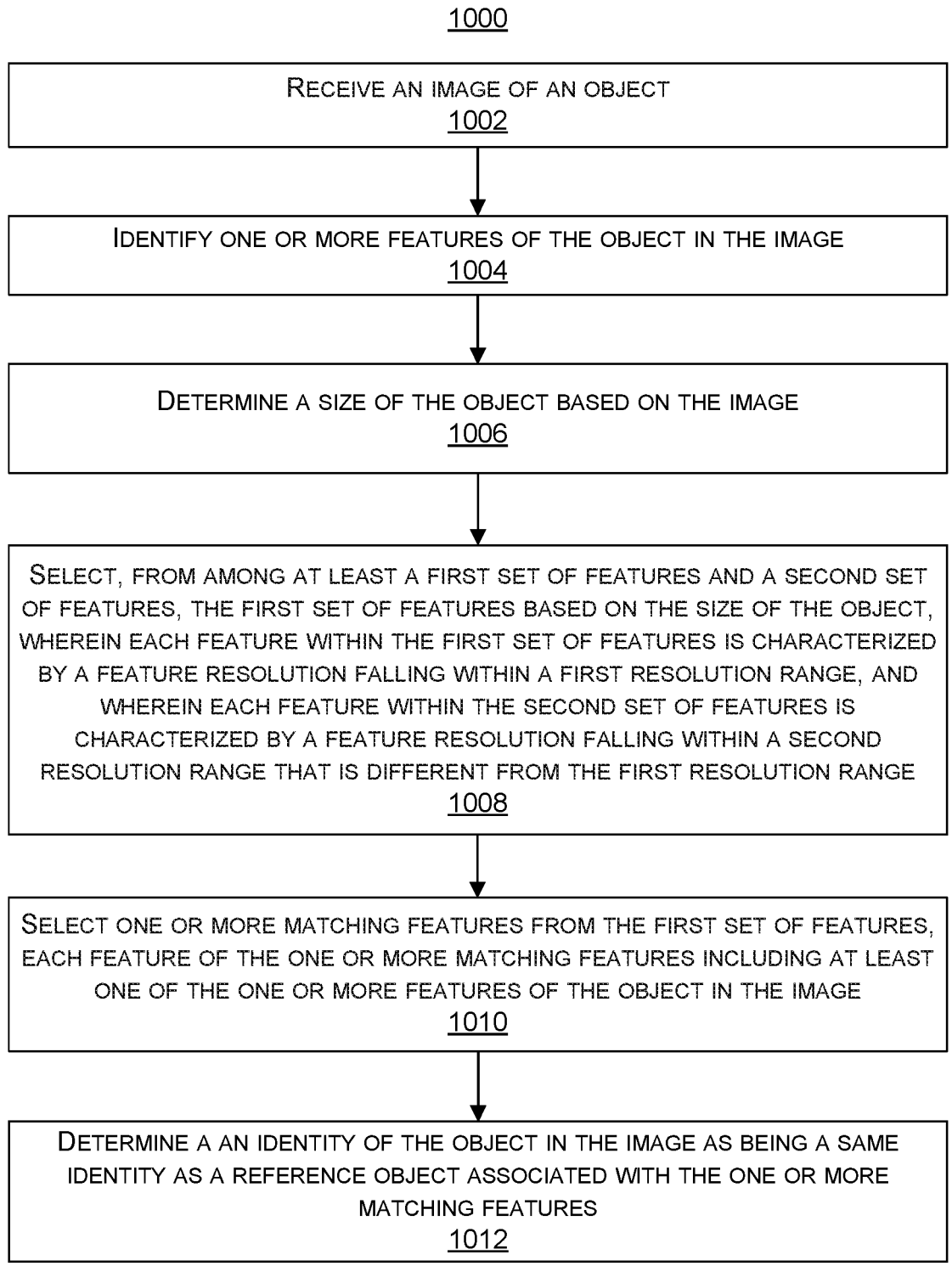
FIG. 10 is a flowchart illustrating another example of a process of determining features for one or more objects in one or more video frames, in accordance with some embodiments.

FIG. 10 is a flowchart illustrating an example of a process 1000 of determining features for one or more objects using the techniques described herein. At block 1002, the process 1000 includes receiving an image of an object. In some examples, the image is detected in a video frame or a still image. For example, the image of the object can include a portion of a larger image or video frame. In some aspects, the unknown object includes a face or other object of interest.

At block 1004, the process 1000 includes identifying one or more features of the object in the image. This may be performed as discussed above, for example with respect to the feature extraction engine 218 of FIG. 2.

At block 1006, the process 1000 includes determining a size of the object based on the image. In one illustrative example, the size can be determined based on an inter-landmark distance between landmarks of the object, such as an inter-eye distance if the object is a face. Any other size-based metric can be used as an alternative or in addition to the inter-landmark distance.

At block 1008, the process 1000 includes selecting, from among at least a first set of features and a second set of features, the first set of features based on the size of the object. The first set of features is different than the second set of features. Each feature within the first set of features is characterized by a feature resolution falling within a first resolution range, and each feature within the second set of features is characterized by a feature resolution falling within a second resolution range that is different from the first resolution range. As noted above, the resolution of the features of an object indicates a quality of the object features. In some cases, the feature resolution of an object's features extracted from an image is independent of the resolution of the image itself.

In some examples, with respect to block 1008, the first set of features can include higher feature resolutions than the second set of features. For instance, the first set of features can be a set of one or more high resolution features from the enrolled database and the second set of features can be a set of one or more low resolution features from the enrolled database. In such examples, the process 1000 can include determining that the size of the object is greater than a size threshold, and the first set of features can be selected based on the size of the object being greater than the size threshold. Such examples can occur when the size of the object is large enough, for example by exceeding the threshold size. For instance, if the size of the object is greater than the threshold value (e.g., an inter-landmark distance is greater than a threshold distance, or other threshold value), the one or more high resolution features can be selected from the enrolled database.

In some examples, the first set of features can include lower feature resolutions than the second set of features. For example, the first set of features can be a set of one or more low resolution features from the enrolled database and the second set of features can be a set of one or more high resolution features from the enrolled database. In such examples, the process 1000 can include determining that the size of the object is less than a size threshold, and the first set of features can be selected based on the size of the object being less than the size threshold. Such examples can occur when the size of the object is small enough, for example by being less than the threshold size. For instance, if the size of the object is less than the threshold value (e.g., an inter-landmark distance is less than a threshold distance, or other threshold value), the one or more low resolution features can be selected from the enrolled database.

At block 1010, the process 1000 includes selecting one or more matching features from the first set of features, each feature of the one or more matching features including at least one of the one or more features of the object in the image. At block 1012, the process 1000 includes determining an identity of the object in the image as being a same identity as a reference object associated with the one or more matching features. These steps may be performed as discussed above, for example with respect to the identification/verification engine 219 of FIG. 2.

While blocks 906 and 1008 of the process 900 and the process 1000, respectively, focus on selecting or determining either high resolution features or low resolution features to compare to features of an image based on a size of the image, other feature variations may alternately or additionally be selected, such as features that vary based on brightness, contrast, saturation, gamma, sharpness, levels, color, hue, color balance, combinations thereof, or the other parameters.

In some examples, the first set of features includes lower feature resolutions than the second set of features. For instance, as noted above, the first set of features can include one or more low resolution features and the second set of features can include one or more high resolution features. The one or more low resolution features are associated with a lower resolution than the one or more high resolution features. In some cases, the process 1000 can include identifying one or more features of the second set of features (the high resolution features) from an image of the reference object, and storing the one or more features identified from the image in an enrolled database.

In some examples, the process 1000 can normalize the image of the reference object, as described above. For example, the image of the reference object can be normalized by identifying one or more landmark features of the reference object, scaling the image of the reference object, and aligning the one or more landmark features of the reference object with one or more landmark features of an object template.

In some examples, the process 1000 can include generating one or more features of the first set of features (the low resolution features). For example, the process 1000 can include generating a modified image of the reference object by modifying pixel values of the image of the reference object. The modified image of the reference object can be generated using a low pass filter. For example, a filtered image can be generated using a low pass filter that filters out one or more high frequency components of the image of the reference object. A downsampled image can then be generated by downsampling the filtered image, and an upsampled image can be generated by upsampling the downsampled image. The one or more features of the first set of features can then be identified using the upsampled image. The process 1000 can further include identifying the one or more features of the first set of features from the modified image. The one or more features of the first set of features can be stored in the enrolled database.

In some cases, the first set of features includes higher feature resolutions than the second set of features. For instance, as noted above, the first set of features can include one or more high resolution features and the second set of features can include one or more low resolution features. The one or more high resolution features are associated with a higher resolution than the one or more low resolution features. In some cases, the process 1000 can include identifying one or more features of the first set of features (the high resolution features) from an image of the reference object, and storing the one or more features identified from the image in an enrolled database.

In some examples, the process 1000 can normalize the image of the reference object, as described above. For example, the image of the reference object can be normalized by identifying one or more landmark features of the reference object, scaling the image of the reference object, and aligning the one or more landmark features of the reference object with one or more landmark features of an object template.

In some examples, the process 1000 can include generating one or more features of the second set of features (the low resolution features). For example, the process 1000 can include generating a modified image of the reference object by modifying pixel values of the image of the reference object. As described above, the modified image of the reference object can be generated using a low pass filter. The process 1000 can further include identifying the one or more features of the second set of features from the modified image. The one or more features of the second set of features can be stored in the enrolled database.

In some examples, the processes 800, 900, and/or 1000 may be performed by a computing device or an apparatus. In one illustrative example, the processes 800, 900, and/or 1000 can be performed by the object detection and recognition system 200 shown in FIG. 2. In some cases, the computing device or apparatus may include a processor, microprocessor, microcomputer, or other component of a device that is configured to carry out the steps of processes 800, 900, and/or 1000. In some examples, the computing device or apparatus may include a camera configured to capture video data (e.g., a video sequence) including video frames. For example, the computing device may include a camera device (e.g., an IP camera or other type of camera device) that may include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Processes 800, 900, and 1000 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 800, 900, and/or 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The object detection and recognition techniques discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

As noted above, one of ordinary skill will appreciate that the less than ("<") and greater than (">") symbols or terminology used herein can be replaced with less than or equal to ("≤") and greater than or equal to ("≥") symbols, respectively, without departing from the scope of this description.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method for object recognition, the method comprising:
    receiving an image of an object;
    determining, based on the image, an inter-landmark distance between a plurality of landmark features of the object;
    selecting, from among at least a first set of stored features extracted from a first set of images of one or more reference objects and a second set of stored features extracted from a second set of images of the one or more reference objects, the first set of stored features based on a comparison between the inter-landmark distance and a size threshold, wherein each feature within the first set of stored features is characterized by a feature resolution falling within a first resolution range, and wherein each feature within the second set of stored features is characterized by a feature resolution falling within a second resolution range that is different from the first resolution range;
    matching, in response to selection of the first set of stored features and based on a comparison between one or more features extracted from the image and the first set of stored features extracted from the first set of images of the one or more reference objects, the one or more features to one or more matching features from the first set of stored features, wherein each feature of the one or more matching features includes at least one feature of the object of the one or more features of the image; and determining, based on matching of the one or more features to the one or more matching features, an identity of the object in the image as being a same identity as a reference object having the one or more matching features, wherein the one or more reference objects include the reference object.

2. The method of claim 1, further comprising determining that the inter-landmark distance is less than the size threshold based on the comparison between the inter-landmark distance and the size threshold, wherein the first set of stored features is selected based on the inter-landmark distance being less than the size threshold, and wherein the first set of stored features includes lower feature resolutions than the second set of stored features.

3. The method of claim 1, further comprising determining that inter-landmark distance is greater than the size threshold based on the comparison between the inter-landmark distance and the size threshold, wherein the first set of stored features is selected based on the inter-landmark distance being greater than the size threshold, and wherein the first set of stored features includes higher feature resolutions than the second set of stored features.

4. The method of claim 1, wherein the first set of stored features includes lower feature resolutions than the second set of stored features.

5. The method of claim 4, further comprising:
identifying one or more features of the second set of stored features from an image of the reference object; and
storing the one or more features identified from the image in an enrolled database.

6. The method of claim 5, further comprising normalizing the image of the reference object based on identifying the plurality of landmark features of the reference object, scaling the image of the reference object, and aligning the plurality of landmark features of the reference object with one or more landmark features of an object template.

7. The method of claim 5, further comprising generating one or more features of the first set of stored features, including:
generating a modified image of the reference object, the modified image being generated by modifying pixel values of the image of the reference object;
identifying the one or more features of the first set of stored features from the modified image; and
storing the one or more features of the first set of stored features in the enrolled database.

8. The method of claim 7, wherein generating the modified image of the reference object includes:
generating a filtered image using a low pass filter, the low pass filter filtering out one or more high frequency components of the image of the reference object;
generating a downsampled image by downsampling the filtered image; and
generating an upsampled image by upsampling the downsampled image, wherein the one or more features of the first set of stored features are identified using the upsampled image.

9. The method of claim 1, wherein the first set of stored features includes higher feature resolutions than the second set of stored features.

10. The method of claim 9, further comprising:
identifying one or more features of the first set of stored features from an image of the reference object; and
storing the one or more features identified from the image in an enrolled database.

11. The method of claim 10, further comprising normalizing the image of the reference object by identifying the plurality of landmark features of the reference object, scaling the image of the reference object, and aligning the plurality of landmark features of the reference object with one or more landmark features of an object template.

12. The method of claim 10, further comprising generating one or more features of the second set of stored features, including:
generating a modified image of the reference object, the modified image being generated by modifying pixel values of the image of the reference object;
identifying the one or more features of the second set of stored features from the modified image; and
storing the one or more features of the second set of stored features in the enrolled database.

13. The method of claim 12, wherein generating the modified image of the reference object includes:
generating a filtered image using a low pass filter, the low pass filter filtering out one or more high frequency components of the image of the reference object;
generating a downsampled image by downsampling the filtered image; and
generating an upsampled image by upsampling the downsampled image, wherein the one or more features of the second set of stored features are identified using the upsampled image.

14. The method of claim 1, wherein the image is a video frame.

15. The method of claim 1, wherein the object detected in the image includes a face, and wherein the inter-landmark distance is an inter-eye distance between two eyes of the face in the image.

16. The method of claim 1, wherein the first set of stored features is different than the second set of stored features.

17. The method of claim 1, further comprising:
extracting the one or more features of the image at an extracted feature resolution of a plurality of possible extracted feature resolutions, wherein the extracted feature resolution is based on the inter-landmark distance.

18. An apparatus for object recognition, the apparatus comprising:
one or more memory units that store instructions; and
one or more processors that receive an image of an object, wherein execution of the instructions by the one or more processors causes the one or more processors to:
determine, based on the image, an inter-landmark distance between a plurality of landmark features of the object;
select, from among at least a first set of stored features extracted from a first set of images of one or more reference objects and a second set of stored features extracted from a second set of images of the one or more reference objects, the first set of stored features based on a comparison between the inter-landmark distance and a size threshold, wherein each feature within the first set of stored features is characterized by a feature resolution falling within a first resolution range, and wherein each feature within the second set of stored features is characterized by a feature resolution falling within a second resolution range that is different from the first resolution range;
match, in response to selection of the first set of stored features and based on a comparison between one or more features extracted from the image and the first set of stored features extracted from the first set of images of the one or more reference objects, the one or more features to one or more matching features from the first set of stored features, wherein each feature of the one or more matching features includes at least one feature of the object of the one or more features of the image; and determine, based on matching of the one or more features to the one or more matching features, an identity of the object in the image as being a same identity as a reference object having the one or more matching features, wherein the one or more reference objects include the reference object.

19. The apparatus of claim 18, wherein execution of the instructions by the one or more processors causes the one or more processors to also determine that the inter-landmark distance is less than the size threshold based on the comparison between the inter-landmark distance and the size threshold, wherein the first set of stored features is selected based on the inter-landmark distance being less than the size threshold, and wherein the first set of stored features includes lower feature resolutions than the second set of stored features.

20. The apparatus of claim 18, wherein execution of the instructions by the one or more processors causes the one or more processors to also determine that the inter-landmark distance is greater than the size threshold based on the comparison between the inter-landmark distance and the size threshold, wherein the first set of stored features is selected based on the inter-landmark distance being greater than the size threshold, and wherein the first set of stored features includes higher feature resolutions than the second set of stored features.

21. The apparatus of claim 18, wherein the first set of stored features includes lower feature resolutions than the second set of stored features.

22. The apparatus of claim 21, wherein execution of the instructions by the one or more processors causes the one or more processors to also:
identify one or more features of the second set of stored features from an image of the reference object; and
store the one or more features identified from the image in an enrolled database.

23. The apparatus of claim 22, wherein execution of the instructions by the one or more processors causes the one or more processors to also normalize the image of the reference object by identifying the plurality of landmark features of the reference object, scaling the image of the reference object, and aligning the plurality of landmark features of the reference object with one or more landmark features of an object template.

24. The apparatus of claim 22, wherein execution of the instructions by the one or more processors causes the one or more processors to also generate one or more features of the first set of stored features by:
generating a modified image of the reference object, the modified image being generated by modifying pixel values of the image of the reference object;
identifying the one or more features of the first set of stored features from the modified image; and
storing the one or more features of the first set of stored features in the enrolled database.

25. The apparatus of claim 24, wherein generating the modified image of the reference object includes:
generating a filtered image using a low pass filter, the low pass filter filtering out one or more high frequency components of the image of the reference object;
generating a downsampled image by downsampling the filtered image; and
generating an upsampled image by upsampling the downsampled image, wherein the one or more features of the first set of stored features are identified using the upsampled image.

26. The apparatus of claim 18, wherein the first set of stored features includes higher feature resolutions than the second set of stored features.

27. The apparatus of claim 26, wherein execution of the instructions by the one or more processors causes the one or more processors to also:
identify one or more features of the first set of stored features from an image of the reference object; and
store the one or more features identified from the image in an enrolled database.

28. The apparatus of claim 27, wherein execution of the instructions by the one or more processors causes the one or more processors to also generate the one or more features of the second set of stored features by:
generating a modified image of the reference object, the modified image being generated by modifying pixel values of the image of the reference object;
identifying the one or more features of the second set of stored features from the modified image; and
storing the one or more features of the second set of stored features in the enrolled database.

29. The apparatus of claim 18, wherein the first set of stored features is different than the second set of stored features.

30. The apparatus of claim 18, further comprising at least one of a camera configured to capture the image of the object and a display configured to display the image of the object.

* * * * *